(12) United States Patent
Lakic et al.

(10) Patent No.: US 12,371,190 B2
(45) Date of Patent: Jul. 29, 2025

(54) MANUFACTURING SYSTEMS AND METHODS FOR SHAPING AND ASSEMBLING FLEXIBLE STRUCTURES

(71) Applicant: The Boeing Company, Arlington, VA (US)

(72) Inventors: Branko Lakic, Kirkland, WA (US); Monica Tatar, Bothell, WA (US); Jeffrey H. Hunt, Thousand Oaks, CA (US); Nicholas A. Norman, Summerville, SC (US); Christopher A. Greer, Greenwood, SC (US)

(73) Assignee: The Boeing Company, Arlington, VA (US)

( * ) Notice: Subject to any disclaimer, the term of this patent is extended or adjusted under 35 U.S.C. 154(b) by 64 days.

(21) Appl. No.: 18/311,382

(22) Filed: May 3, 2023

(65) Prior Publication Data
US 2024/0367818 A1 Nov. 7, 2024

(51) Int. Cl.
B64F 5/10 (2017.01)
B21D 53/92 (2006.01)
B64C 1/06 (2006.01)
G01B 11/25 (2006.01)

(52) U.S. Cl.
CPC ............... B64F 5/10 (2017.01); B21D 53/92 (2013.01); G01B 11/2518 (2013.01); *B64C 1/069* (2013.01)

(58) Field of Classification Search
CPC ......... B64F 5/10; B25B 11/005; B21D 53/92; B23K 37/0533
See application file for complete search history.

(56) References Cited

U.S. PATENT DOCUMENTS 2,800,867 A * 7/1957 Smith ................ B23K 37/0533
269/189
4,039,115 A * 8/1977 Randolph .......... B23K 37/0538
269/287

(Continued)

FOREIGN PATENT DOCUMENTS

CN 114239170 A * 3/2022
EP 3249482 A1 11/2017

(Continued)

OTHER PUBLICATIONS

CN-114239170-A Translation (Year: 2022).*

(Continued)

*Primary Examiner* — Michael W Hotchkiss
(74) *Attorney, Agent, or Firm* — Walters & Wasylyna LLC

(57) ABSTRACT

A manufacturing system includes a holding structure and actuators that are coupled to the holding structure. The actuators support the component and apply displacements to select locations of the component to change a current shape of the component toward a target shape of the component. The system includes a metrology system that takes measurements of the current shape of the component. The system includes a controller that utilizes a closed feedback loop to determine a deviation between the current shape and the target shape based on the measurements and to provide commands that iteratively change the displacements in response to changes in the current shape until the current shape is within a tolerance of the target shape.

25 Claims, 29 Drawing Sheets

(56) References Cited

U.S. PATENT DOCUMENTS

| | | | | |
|---|---|---|---|---|
| 4,491,307 | A * | 1/1985 | Ellefson | B23K 37/053 |
| | | | | 269/287 |
| 4,504,047 | A * | 3/1985 | Jantzen | B23K 9/0284 |
| | | | | 269/287 |
| 4,527,783 | A * | 7/1985 | Collora | B25B 11/005 |
| | | | | 269/297 |
| 4,666,138 | A * | 5/1987 | Dearman | B23K 37/0533 |
| | | | | 269/287 |
| 5,249,785 | A * | 10/1993 | Nelson | B25B 11/005 |
| | | | | 269/21 |
| 7,328,874 | B2 * | 2/2008 | Tenma | F16L 3/105 |
| | | | | 248/65 |
| 8,266,778 | B2 * | 9/2012 | Neuhaus | B64F 5/10 |
| | | | | 29/428 |
| 8,322,700 | B2 * | 12/2012 | Saberton | B25B 11/005 |
| | | | | 29/559 |
| 8,370,114 | B1 * | 2/2013 | Saisan | G01B 21/20 |
| | | | | 73/104 |
| 9,132,924 | B2 | 9/2015 | Stark et al. | |
| 9,453,720 | B2 | 9/2016 | Hunt et al. | |
| 9,682,788 | B2 | 6/2017 | Hunt et al. | |
| 9,815,543 | B2 | 11/2017 | Koncz | |
| 9,921,566 | B1 | 3/2018 | Tatar et al. | |
| 9,927,227 | B2 * | 3/2018 | Hunt | G01B 11/2518 |
| 10,509,388 | B2 * | 12/2019 | Regnault | G05B 19/402 |
| 10,730,641 | B2 | 8/2020 | Hunt et al. | |
| 11,131,982 | B2 | 9/2021 | Hunt et al. | |
| 11,273,930 | B2 * | 3/2022 | Hunt | B64F 5/10 |
| 11,850,989 | B2 * | 12/2023 | Kloepfer | B62D 53/06 |
| 2006/0118235 | A1 * | 6/2006 | Lum | B64F 5/10 |
| | | | | 156/285 |
| 2007/0256288 | A1 * | 11/2007 | Vermaat | B23K 37/0533 |
| | | | | 228/44.5 |
| 2008/0256776 | A1 * | 10/2008 | Neuhaus | B64F 5/10 |
| | | | | 29/446 |
| 2011/0190941 | A1 * | 8/2011 | Marsh | B64F 5/60 |
| | | | | 700/275 |
| 2012/0130528 | A1 * | 5/2012 | Stark | B64F 5/10 |
| | | | | 700/114 |
| 2014/0366600 | A1 * | 12/2014 | Kozaki | B21D 5/0209 |
| | | | | 72/21.4 |
| 2017/0015440 | A1 * | 1/2017 | Hunt | B21D 53/92 |
| 2017/0247122 | A1 * | 8/2017 | Hunt | G01B 11/2518 |
| 2018/0208328 | A1 | 7/2018 | Charlton et al. | |
| 2022/0212347 | A1 | 7/2022 | Hull et al. | |

FOREIGN PATENT DOCUMENTS

| | | | | |
|---|---|---|---|---|
| EP | 2756934 B1 * | 9/2019 | | B25J 15/0061 |
| FR | 2788743 A1 * | 7/2000 | | B23P 19/04 |
| KR | 20140047858 A * | 4/2014 | | |

OTHER PUBLICATIONS

FR-2788743-A1 Translation (Year: 2000).*
KR20140047858A Translation (Year: 2014).*
Manohar "Predicting Shim gaps in aircraft assembly with machine learning and sparse sensing", Mar. 2018, Elsevier, pp. 87-89 (Year: 2018).*
European Patent Office, Extended European Search Report, App. No. 24163346.0 (Oct. 28, 2024).

* cited by examiner

MANUFACTURING SYSTEMS AND METHODS FOR SHAPING AND ASSEMBLING FLEXIBLE STRUCTURES

FIELD

The present disclosure relates generally to structure manufacturing and, more particularly, to manufacturing systems and methods for shaping and assembling large, flexible structures.

BACKGROUND

Aerospace structures are often manufactured in large components or pieces that are then assembled to form a final structure. For example, a fuselage of an aircraft can be manufactured in cylindrical or semi-cylindrical fuselage sections, which are then assembled to form the fuselage. Other aerospace examples include wing sections joined to form a wing, stabilizer sections joined to form a stabilizer, and the like. These components are often large enough that gravity or other handling loads can cause the component to flex or deform, thus causing an undesirable change in shape. These large components are also often made of a material, such as a composite material, a metallic material, and the like, that tend to flex under load.

In aerospace structures, it is important to control the shape of the large, flexible component when assembling and joining multiple sections to each other to form the final structure. For example, it is important that the shapes of mating ends of two fuselage sections match as closely as possible. It is also important to control the shape of the large, flexible component when joining sub-structures to the component. For example, it is important that the shapes of a fuselage section or a wing section and internal stiffeners or frames match as closely as possible. As such, differences in the shapes can result in an undesirable fit.

Current processes for joining large, flexible components are time consuming and labor intensive. Additionally, the shapes of the large, flexible components may still not have a desired level of fit between them. Accordingly, those skilled in the art continue with research and development efforts in the field of structure manufacturing by assembling and joining large, flexible components.

SUMMARY

Disclosed are examples of a manufacturing system for assembling a structure, a shaping apparatus for shaping a component of a structure, and a manufacturing method for assembling a structure. The following is a non-exhaustive list of examples, which may or may not be claimed, of the subject matter according to the present disclosure.

In an example, the disclosed manufacturing system includes a holding structure and actuators that are coupled to the holding structure. The actuators support the component and apply displacements to select locations of the component to change a current shape of the component toward a target shape of the component. The system includes a metrology system that takes measurements of the current shape of the component. The system includes a controller that utilizes a closed feedback loop to determine a deviation between the current shape and the target shape based on the measurements and to provide commands that iteratively change the displacements in response to changes in the current shape until the current shape is within a tolerance of the target shape.

In an example, the disclosed shaping apparatus includes a holding structure. The apparatus includes actuators that are coupled to the holding structure and that support the component. The apparatus includes a controller that operates the actuators. The actuators apply displacements to select locations of the component to change a current shape of the component toward a target shape of the component. The controller determines a deviation between the current shape and the target shape based on measurements of the component. The controller provides new displacements for application by the actuators in response to changes in the current shape until the current shape is within a tolerance of the target shape.

In an example, the disclosed manufacturing method includes steps of: (1) holding a component; (2) measuring a current shape of the component; (3) applying displacements to select locations of the component to change the current shape of the component toward a target shape of the component; (4) determining a deviation between the current shape and the target shape; and (5) changing the displacements in response to changes in the current shape until the current shape is within a tolerance of the target shape.

Other examples of the system, the apparatus, and the method disclosed herein will become apparent from the following detailed description, the accompanying drawings, and the appended claims.

DETAILED DESCRIPTION

Referring generally to FIGS. 1A, 1B, 2A, 2B and 3-24, by way of examples, the present disclosure is directed to a manufacturing system 100 for assembling a structure 300. As will be described in more detail herein, examples of the manufacturing system 100 improve and accelerate structural assembly through improved control of the shape of the structure 300 and/or the shapes of components 312 that are joined to form the structure 300. As an illustrative example, the manufacturing system 100 provides an integrated solution for assembling a fuselage 1218 of an aircraft 1200 (FIG. 27) by incorporating adaptive tooling, software systems, and metrology systems. For example, the manufacturing system 100 uses a closed loop control system to iteratively adjust the shape and relative positions of sections of the fuselage 1218 to be joined, thereby achieving optimal shimming and alignment.

Figure 1A:
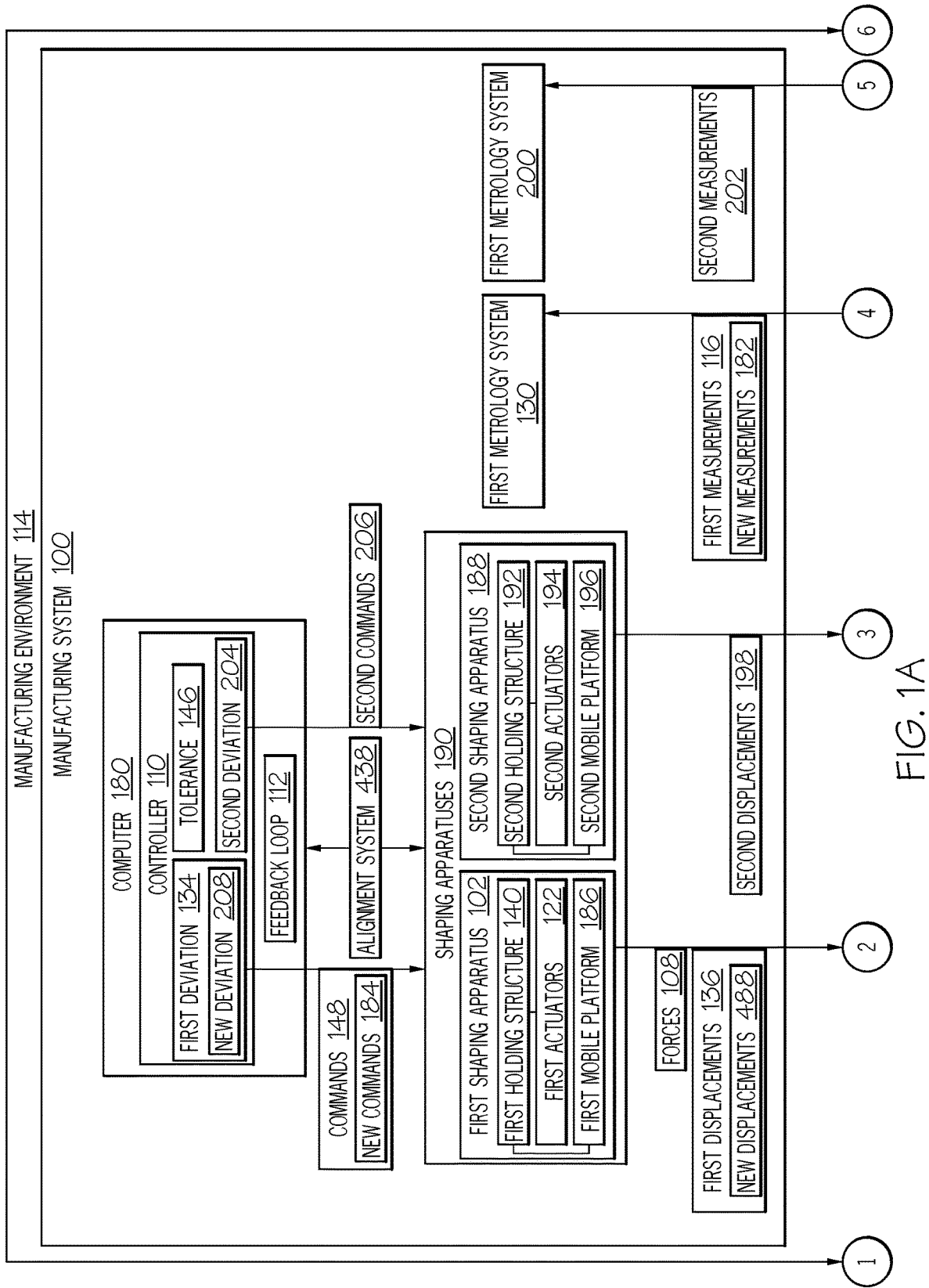
FIGS. 1A and 1B, in combination, are a schematic, block diagram of an example of a manufacturing system for assembling a structure.
Figure 1B:
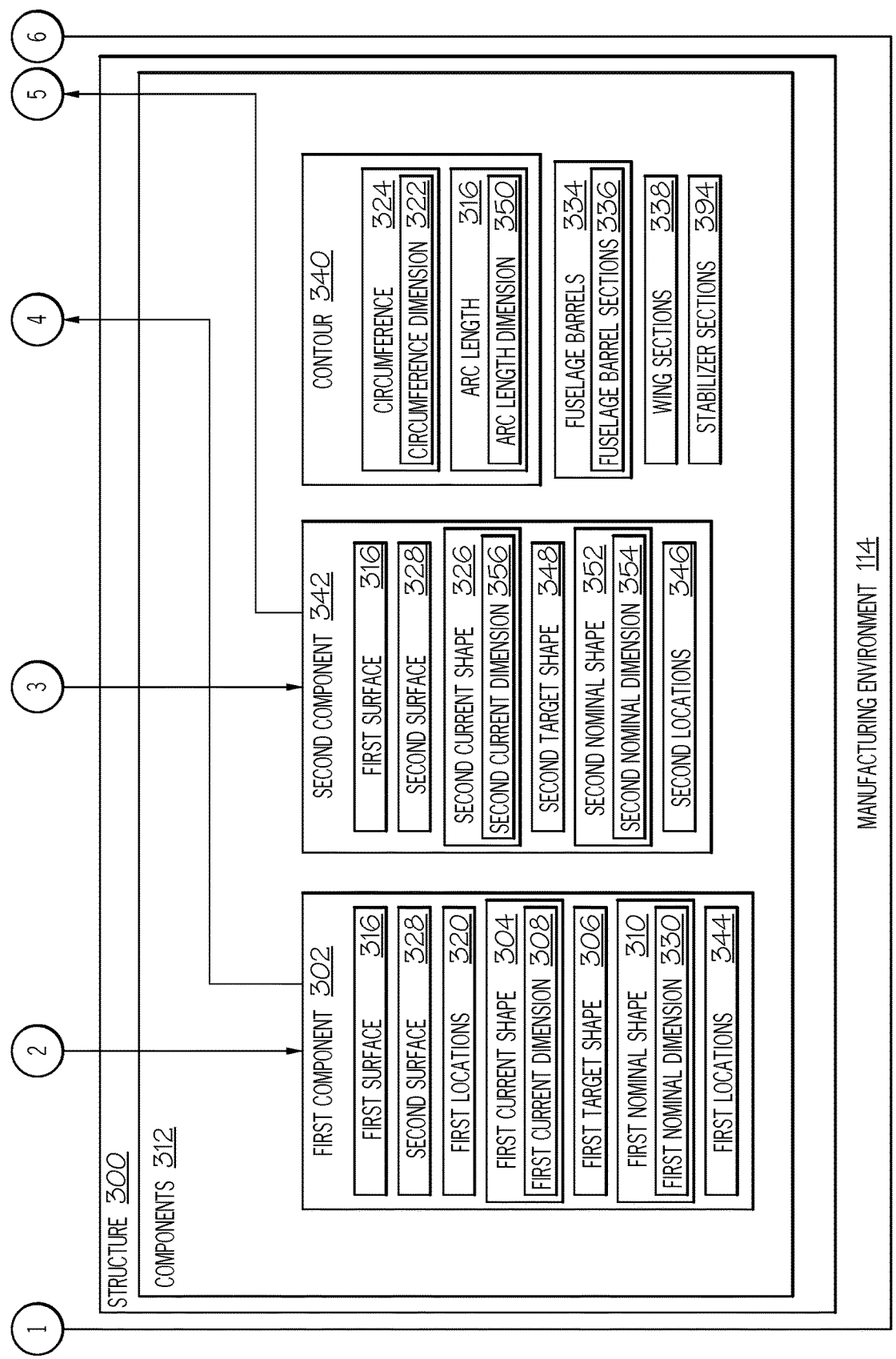

FIGS. 1A and 1B, also generally referred to herein as FIG. 1, schematically illustrate an example of a manufacturing environment 114. The manufacturing environment includes the manufacturing system 100, which is used to shape and join the components 312 that form the structure 300. In various examples, the structure 300 can include any number of the components 312. Generally, the manufacturing system 100 enables the shape of one or more of the components 312 to be actively monitored and controlled. In other words, the shape of one or more of the components 312 can maintained and/or changed as needed throughout an entirety of the manufacturing process. As an example, one or more of the components 312 can be shaped and held in at least approximately the same shape as originally fabricated, such as in the same shape as formed on a mold or mandrel. In these examples, shaping and holding the components 312 in an as-fabricated shape reduces or eliminates undesirable pre-loading and/or application of external forces associated with transporting the components 312. As another example, one or more of the components 312 can be shaped and held in at least approximately the shape needed to join two or more of the components 312 together or to join other sub-structures to the components 312 during assembly and manufacturing of the structure 300. In these examples, shaping and holding the components 312 in a to-be-joined shape reduces or eliminates gaps and shimming.

Figure 27:
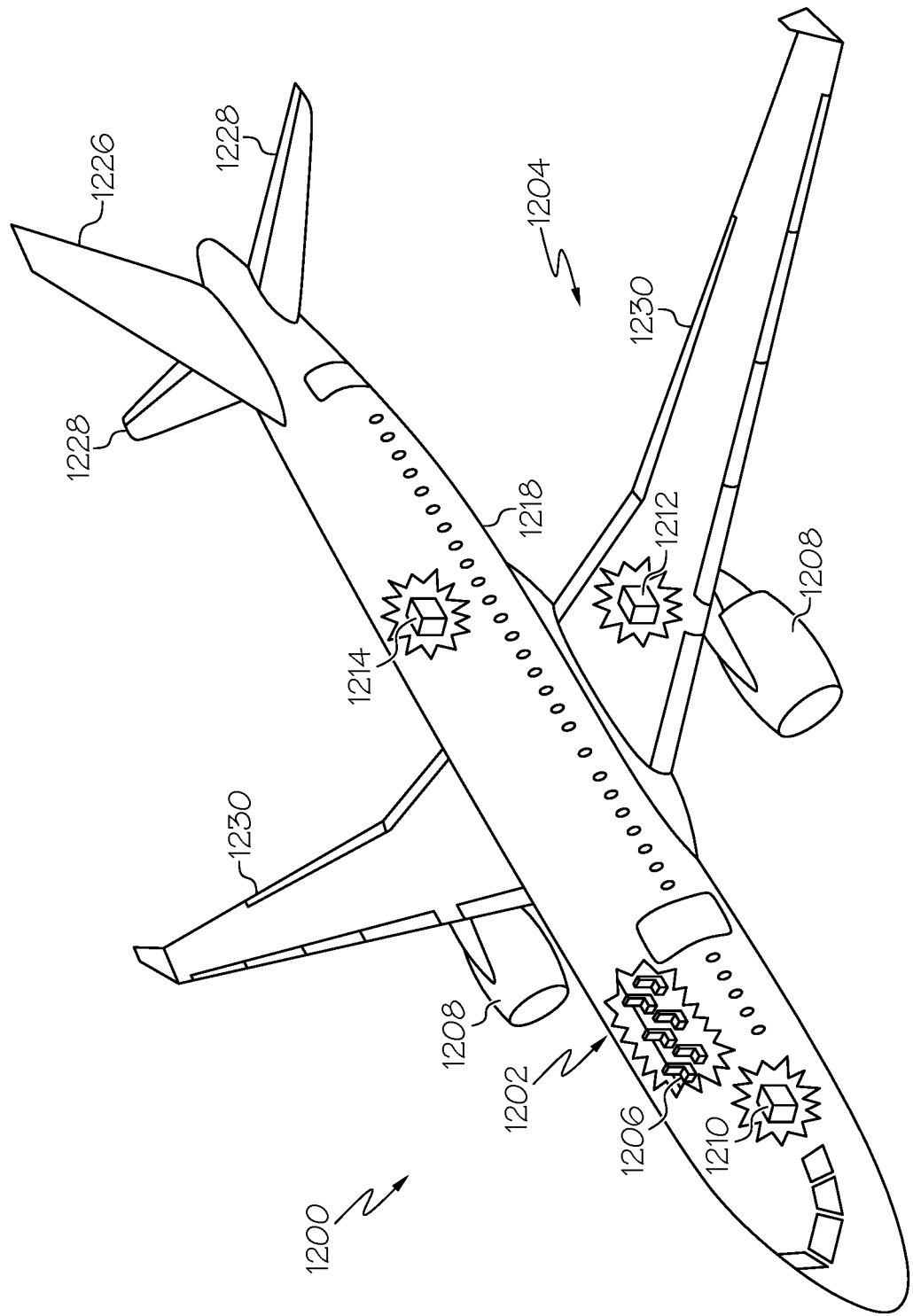
FIG. 27 is a schematic illustration of an example of an aircraft.

In one or more examples, the manufacturing system 100 is used to shape fuselage barrels 334 (examples of the components 312) before and/or while joining the fuselage barrels 334 to form the fuselage 1218 (an example of the structure 300) of the aircraft 1200 (FIG. 27). In one or more examples, the manufacturing system 100 is used to shape fuselage barrel sections 336 (examples of the components 312) before and/or while joining the fuselage barrel sections 336 to form one of the fuselage barrels 334 (an example of the structure 300). In other examples, the manufacturing system 100 is used to shape and join wing sections 338 (e.g., components 312) to form the one of a pair of wings 1230 (e.g., structure 300) of the aircraft 1200, to shape and join stabilizer sections 394 (e.g., components 312) to form horizontal stabilizers 1228 and/or vertical stabilizers 1226 of the aircraft 1200. While aerospace examples are illustrated, aspects of the manufacturing system 100 can be used to shape and join any suitable type of components for various types of structures.

Referring still to FIGS. 1A and 1B, in one or more examples, the manufacturing system 100 includes a first holding structure 140, a plurality of first actuators 122, a first metrology system 130, and a controller 110. The first actuators 122 are coupled to the first holding structure 140. The first actuators 122 support a first component 302 (e.g., one of the components 312). The first actuators 122 apply displacements 142 to select first locations 320 of the first component 302 to change a first current shape 304 of the first component 302 toward a first target shape 306 of the first component 302.

In one or more examples, the first holding structure 140 serves as an underlying, physical support structure that holds the first actuators 122. The first actuators 122 engage (e.g., contact) and support the first component 302. In one or more examples, the first actuators 122 are releasably coupled to a first surface 314 (e.g., holdable surface) of the first component 302, for example, at the select first locations 320. In one or more examples, the first surface 314 is an exterior surface of the first component 302 (e.g., an outer mold line of a composite component).

In one or more examples, the first actuators 122 apply the first displacements 136 to the first component 302 by pushing and/or pulling on the first component 302 at the select first locations 320. For example, the first actuators 122 apply the first displacements 136 to the select first locations 320 of the first component 302 by applying forces 108 to first component 302. Changes in the first displacements 136 refer to a change in magnitude, dimension, or direction of the displacement. As such, the first displacements 136 and/or changes in the first displacements 136 change the relative position of the select first locations 320 and regions surrounding the select first locations 320, thereby adjusting the first current shape 304 of the first component 302. For example, the first displacements 136 are selectively applied to the first component 302 in a manner that causes the first current shape 304 to change toward the first target shape 306.

Generally, the shape of the first component 302 refers to the geometry of the first component 302 in one or more dimensions. In particular, the first current shape 304 and the first target shape 306 refer to a contour 340 or profile shape (e.g., viewed along an orthogonal axis) of the first component 302. As an example, the first current shape 304 and the first target shape 306 refer to the contour 340 around a circumference 324 of a cylindrical component (e.g., an instance of the fuselage barrels 334). As another example, the first current shape 304 and the first target shape 306 refer to the contour 340 along an arc length 316 or profile of an arcuate or curved component (e.g., an instance of the fuselage barrel sections 336).

In one or more examples, the first metrology system 130 takes first measurements 116 of the first current shape 304 of the first component 302. In one or more examples, the first metrology system 130 includes any suitable type of sensor system that includes various hardware and software components. The first metrology system 130 generates the first measurements 116 of the first component 302. For example, the first metrology system 130 takes measurements of the relative position of a second surface 328 (e.g., a measurable surface) of the first component 302 that is opposite the first surface 314 of the first component 302. In one or more examples, the second surface 328 is an interior surface of the first component 302 (e.g., an inner mold line of a composite component). The first current shape 304 of the first component 302 is determined based on the first measurements 116. In one or more examples, the first metrology system 130 is a non-contact measurement device such that the first measurements 116 are made without contacting or touching the first component 302. Examples of the first metrology system 130 include laser position sensors, time-of-flight laser rangefinders, laser scanners, structured light (e.g., 3D) scanners, lidar scanners, combinations thereof, and the like.

In one or more examples, the controller 110 is coupled to or is in communication with the first metrology system 130 and the each one of the first actuators 122. In one or more examples, the controller 110 controls operation of the first metrology system 130 and the first actuators 122. In one or more examples, the controller 110 is part of or is implemented by a computer 180. As such, one or more of the operations described herein as being performed by the controller 110 may alternatively be performed by the computer 180. Similarly, one or more of the operations described herein as being performed by the computer 180 may alternatively be performed by the controller 110.

In one or more examples, the controller 110 utilizes a closed feedback loop 112 to determine a first deviation 134 between the first current shape 304 and the first target shape 306 based on the first measurements 116 and to provide commands 148 that iteratively change the displacements 142 in response to incremental changes in the first current shape 304 until the first current shape 304 is within a tolerance 146 of the first target shape 306. In one or more examples, the closed feedback loop 112 includes the controller 110, the first actuators 122, and the first metrology system 130.

In one or more examples, the controller 110 receives the first measurements 116 from the first metrology system 130. The controller 110 determines the first deviation 134 between the first current shape 304 and the first target shape 306 based on the first measurements 116. In these examples, the first deviation 134 refers to the difference or error between the first current shape 304 and the first target shape 306. The controller 110 determines the displacements 142 needed to change the first current shape 304 to the first target shape 306. The controller 110 generates and sends the commands 148 to the first actuators 122 to selectively apply the first displacements 136 to the first component 302 to change the first current shape 304 toward the first target shape 306.

After the first displacements 136 are applied, the first metrology system 130 takes new measurements 182 (e.g., a subsequent instance of the first measurements 116) of the first current shape 304 of the first component 302. The controller 110 again determines the first deviation 134 between the first current shape 304 and the first target shape 306 based on the new measurements 182 and determines whether the first current shape 304 is within the tolerance 146 of the first target shape 306.

In some examples, after the displacements 142 are applied to the first component 302, the displacements 142 may not result in the first current shape 304 being within the tolerance 146 of the first target shape 306. Instead, the first current shape 304 is closer to the first target shape 306 but is not within the tolerance 146 allowable for further assembly. In these examples, the first metrology system 130 takes the new measurements 182 (e.g., a subsequent instance of the first measurements 116) of the first current shape 304 of the first component 302. The controller 110 uses the new measurements 182 as feedback to determine a new deviation 208 (e.g., a subsequent instance of the first deviation 134) between the first current shape 304 and the first target shape 306. If the first current shape 304 is not within the tolerance 146 of the first target shape 306, the controller 110 determines changes in the displacements 142 (e.g., new displacements 488) that are needed to change the first current shape 304 further toward the first target shape 306. The controller 110 generates and sends new commands 184 (e.g., a subsequent instance of the commands 148) to the first actuators 122 to apply the new displacements 488 (e.g., a subsequent instance of the displacements 142) to the component 360 to change the first current shape 304 further toward the first target shape 306.

In one or more examples, the first holding structure 140 and the first actuators 122 are components of a first shaping apparatus 102. In one or more examples, the first shaping apparatus 102 includes a first mobile platform 186. In these examples, the first holding structure 140 is coupled to the first mobile platform 186. The first mobile platform 186 enables movement of the first component 302, supported by the first holding structure 140 and the first actuators 122, within the manufacturing environment 114. In one or more examples, the first metrology system 130 is also a component of the first shaping apparatus 102.

In one or more examples, the manufacturing system 100 includes a second shaping apparatus 188. For example, the second shaping apparatus 188 includes a second holding structure 192 and a plurality of second actuators 194 that are coupled to the second holding structure 192. In these examples, the second actuators 194 support a second component 342 (e.g., another one of the components 312) and apply second displacements 198 to select second locations 346 of the second component 342 to change a second current shape 326 of the second component 342 toward a second target shape 348 of the second component 342.

In one or more examples, the manufacturing system 100 includes a second metrology system 200 that takes second measurements 202 of the second current shape 326 of the second component 342. In one or more examples, the first metrology system 130 takes the second measurements 202 of second current shape 326 of the second component 342. In either of these examples, the controller 110 utilizes the closed feedback loop 112 to determine a second deviation 204 between the second current shape 326 and the second target shape 348 based on the second measurements 202 and to provide second commands 206 that iteratively change the second displacements 198 in response to incremental changes in the second current shape 326 until the second current shape 326 is within the tolerance 146 of the second target shape 348.

In one or more examples, the second shaping apparatus 188 includes a second mobile platform 196. In these examples, the second holding structure 192 is coupled to the second mobile platform 196. The second mobile platform 196 enables movement of the second component 342, supported by the second holding structure 192 and the second actuators 194, within the manufacturing environment 114. In one or more examples, the second metrology system 200 is also a component of the second shaping apparatus 188.

In other examples, the manufacturing system 100 includes any number of shaping apparatuses 190. Generally, any other one of the shaping apparatuses 190, includes substantially the same components as the first shaping apparatus 102 and/or the second shaping apparatus 188.

In one or more examples, the first shaping apparatus 102 and the second shaping apparatus 188 are used to shape the first component 302 and the second component 342, respectively, and align the first component 302 and the second component 342 for joining to form the structure 300.

As used herein, current shape refers to an actual, present, or measured shape of an item, such as a component of a structure. As used herein, target shape refers to a desired shape of an item, such as a component of a structure. As used herein, tolerance refers to an allowable amount of variation, for example, as determined by engineering specifications or industry standards. As an example, tolerance can refer to an allowable variation in the dimensions between components to be joined such that a gap formed between the components is less that an allowable limit.

In one or more examples, the first current shape 304 refers to an actual or present shape of the first component 302, for example, as held by the first holding structure 140 and the first actuators 122. Similarly, the second current shape 326 refers to an actual or present shape of the second component 342, for example, as held by the second holding structure 192 and the second actuators 194.

In one or more examples, the first target shape 306 refers to or is based a first nominal shape 310 of the first component 302. Generally, the first nominal shape 310 is defined as a design shape and can be represented by a three-dimensional computer (CAD) model.

In one or more examples, the first target shape 306 refers to or is based on the second current shape 326 of the second component 342. In one or more examples, the second component 342 is flexible enough that gravity or other handling loads cause deformation. In these examples, the second current shape 326 is measured and controlled using the manufacturing system 100 as described herein. In other examples, the second component 342 is rigid enough that gravity or other handling loads do not cause deformation. In these examples, the second current shape 326 is measured but is fixed (i.e., the shape does not change and is not controlled by the manufacturing system 100).

In one or more examples, the first target shape 306 refers to or is based on the first nominal shape 310 as modified by a first current dimension 308 of the first component 302. The first nominal shape 310 includes a first nominal dimension 330, such as a design value for a circumference dimension 322 of a cylindrical instance of the first component 302 or a design value for an arc length dimension 350 of a semi-cylindrical or arcuate instance of the first component 302. The first current dimension 308 is determined, for example, by the controller 110, based on the first measurements 116 taken by the first metrology system 130. The first current dimension 308 refers to the actual, physical dimensions of the first component 302, such as an actual value for the circumference dimension 322 of a cylindrical instance of the first component 302 or an actual value for the arc length dimension 350 of a semi-cylindrical or arcuate instance of the first component 302. As an example, before the displacements 142 are applied, the first metrology system 130 takes the first measurements 116 of the first component 302. The controller 110 determines the first current dimension 308 based on the subsequent instance of the first measurements 116. The controller 110 generates the first target shape 306. The first target shape 306 includes the first nominal shape 310 in which the first nominal dimension 330 of the first component 302 is replaced by the first current dimension 308 of the first component 302.

Similarly, in one or more examples, the second target shape 348 of the second component 342 can be based on a second nominal shape 352 of the second component 342, the first current shape 304 of the first component 302, or the second nominal shape 352 as modified by a second current dimension 356 of the second component 342, in which a second nominal dimension 354 of the second component 342 is replaced by the second current dimension 356 of the second component 342.

Figure 2A:
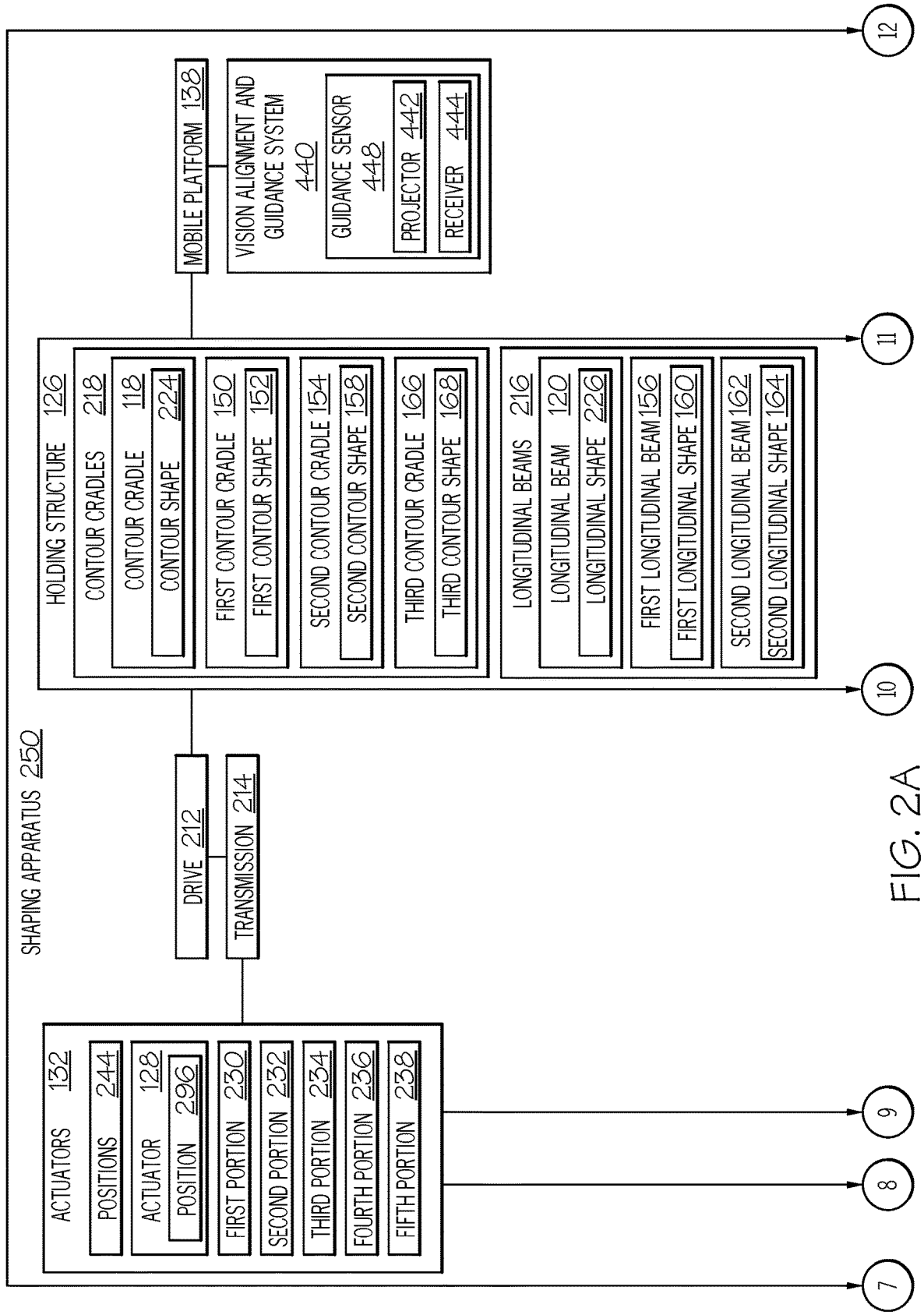
FIGS. 2A and 2B, in combination, are a schematic, block diagram of an example of a shaping apparatus of the manufacturing system.
Figure 2B:
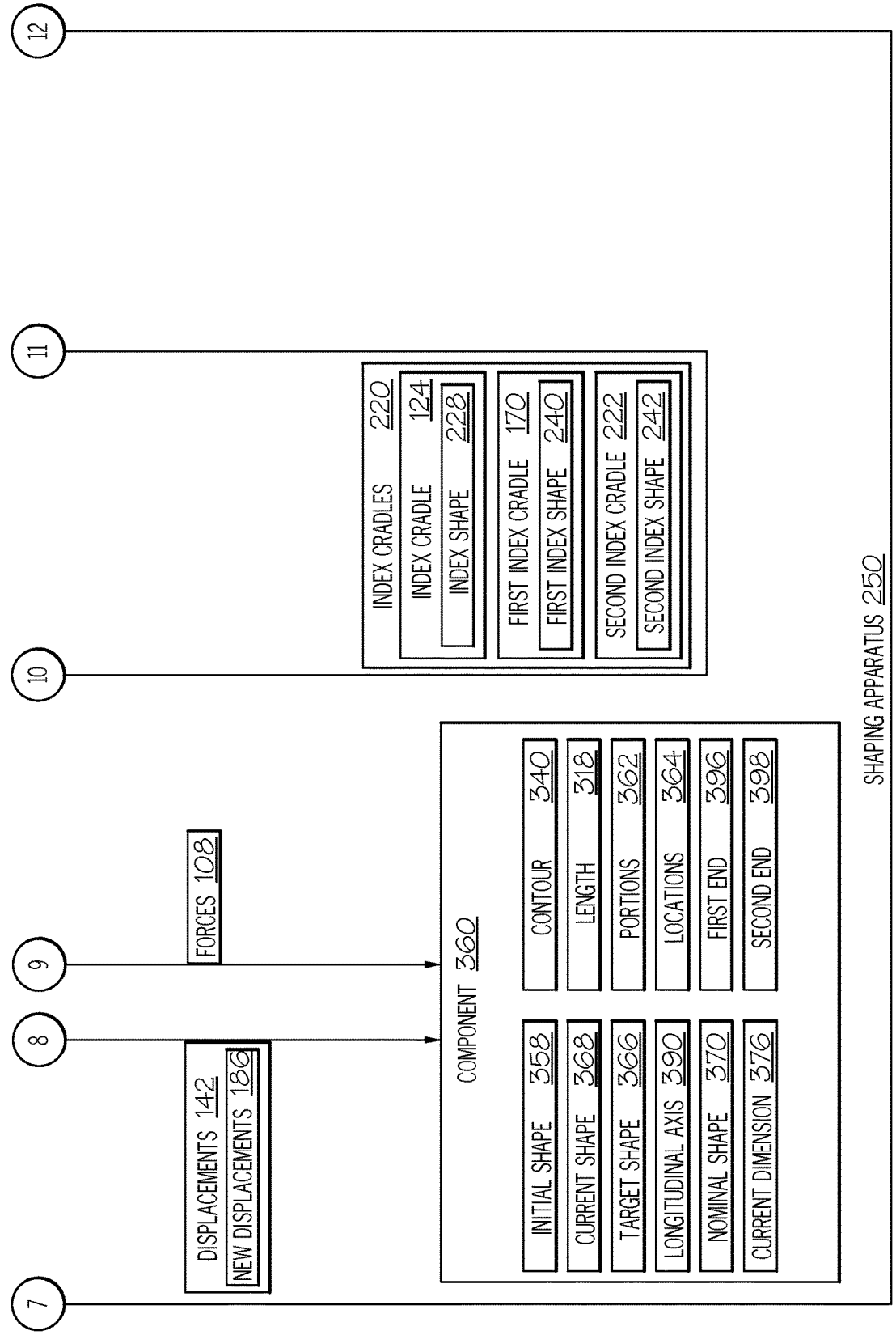

FIGS. 2A and 2B, also generally referred to herein as FIG. 2, schematically illustrate an example of the shaping apparatus 250. The shaping apparatus 250 is configured to apply the displacements 142 to a component 360. The shaping apparatus 250, illustrated in FIGS. 2A and 2B, is an example implementation of one of the shaping apparatuses 190 illustrated in FIG. 1A, such as the first shaping apparatus 102 and/or the second shaping apparatus 188. The component 360, illustrated in FIG. 2B) is an example of one of the components 312 illustrated in FIG. 1B, such as the first component 302 and/or the second component 342. In one or more examples, the shaping apparatus 250 includes the holding structure 126 and the actuators 132. In one or more examples, the shaping apparatus 250 includes a mobile platform 138. In one or more examples, the holding structure 126 is coupled to the mobile platform 138.

In one or more examples, the actuators 132 are coupled to the holding structure 126 and support the component 360. The controller 110 (FIG. 1) is adapted to operate the actuators 132. The actuators 132 apply the displacements 142 to select locations 364 of the component 360 to change a current shape 368 of the component 360 toward a target shape 366 of the component 360. The controller 110 determines the deviation 144 (FIG. 1) between the current shape 368 and the target shape 366 based on the measurements 104 of the component 360. The controller 110 provides new displacements 488 (FIG. 1) for application by the actuators 132 in response to changes in the current shape 368 until the current shape 368 is within the tolerance 146 (FIG. 1) of the target shape 366.

In one or more examples, at least a portion of the actuators 132 (e.g., any one or more of the actuators 132) is movable relative to the holding structure 126. Movement of the actuators 132 relative to the holding structure 126 enables movement and selective positioning of any one or more of the actuators 132 relative to the component 360 and, thus, active determination and/or modification of the select first locations 344 of the component 360 at which the displacements 142 are applied. In one or more examples, the controller 110 (FIG. 1) controls movement of the actuators 132 relative to the holding structure 126 via the commands 148 (FIG. 1) sent to the actuators 132. In these examples, the shaping apparatus 250 includes a drive 212 that produces power and a transmission 214 that transmits power to one or more of the actuators 132 to propel movement of the actuators 132 relative to the holding structure 126. As an example, the drive 212 is a motor and the transmission 214 is a track, a gear assembly, or the like. In one or more examples, the drive 212 and/or transmission 214 are shared among more than one of the actuators 132. In one or more examples, the drive 212 and/or transmission 214 are dedicated to each one of the actuators 132.

In one or more examples, the holding structure 126 includes one or more contour cradles 218. In one or more examples, the contour cradles 218 extend along at least a portion of the contour 340 of the component 360 (e.g., in a profile, arcuate, or circumferential direction). In one or more examples, the contour cradles 218 extend along an entirety of the contour 340 of the component 360. In one or more examples, each one of the contour cradles 218 (e.g., contour cradle 118) has a contour shape 224 that at least approximates an initial shape 358 of at least a portion of the component 360. At least a portion of the actuators 132 are coupled to each one of the contour cradles 218 such that the contour cradles 218 position the actuators 132 at the select locations 364 that extend along at least a portion of, such as an entirety of, the contour 340 of the component 360.

In one or more examples, the holding structure 126 includes one or more longitudinal beams 216. In one or more examples, the longitudinal beams 216 extend along at least a portion of a length 318 of the component 360 (e.g., in a longitudinal or lengthwise direction or along a longitudinal axis 390). In one or more examples, the longitudinal beams 216 extend along an entirety of the length 318 of the component 360. In one or more examples, each one of the longitudinal beams 216 (e.g., longitudinal beam 120) has a longitudinal shape 226 that at least approximates the initial shape 358 of a portion of the component 360. In one or more examples, the longitudinal beams 216 extend between pairs of the contour cradles 218. At least a portion of the actuators 132 are coupled to each one of the longitudinal beams 216 such that the longitudinal beams 216 position the actuators 132 at the select locations 364 that extend along at least a portion of, such as an entirety of, the length 318 of the component 360.

The select locations 364 illustrated in FIG. 2B are examples of the of the select first locations 344 of the first component 302 and/or the select second locations 346 of the second component 342 illustrated in FIG. 1. Generally, the select locations 364 refer to any desired or suitable locations disposed around the contour 340 and/or along the length 318 of the component 360 in which an application of the displacements 142 result in a change to the current shape 368 of the component 360. As an example, the select locations 364 can extend around an entirety of the circumference 324 of the component 360, such as proximate (e.g., at or near) a first end 396 of the component 360, proximate a second end 398 of the component 360, or at any location between the first end 396 and the second end 398. As an example, the select locations 364 can extend along an entirety of the length 318 of the component 360, such as between the first end 396 and the second end 398, at any circumferential location.

In one or more examples, the holding structure 126 includes one or more index cradles 220. The index cradles 220 extend along at least a portion of the contour 340 of the component 360 (e.g., in a profile, arcuate, or circumferential direction). In one or more examples, each one of the index cradles 220 (e.g., index cradle 124) has an index shape 228 that at least approximates the initial shape 358 of at least a portion of the component 360. In one or more examples, each one of the index cradles 220 initially supports a portion of the component 360 before engagement of the actuators 132 and is movable relative to the contour cradles 218 to disengage the component 360 after engagement by the actuators 132.

As used herein, initial shape refers to a shape of an item, such as a component of a structure, at the beginning of a shaping and assembling process for the structure performed by the manufacturing system 100.

In one or more examples, the holding structure 126 includes a first contour cradle 150. The first contour cradle 150 is an example of one of the contour cradles 218. The first contour cradle 150 includes a first contour shape 152 (e.g., an instance of the contour shape 224). The first contour shape 152 at least approximates (e.g., approximately matches) the initial shape 358 of a first contoured portion of the component 360 (e.g., a first portion of the contour 340 of the component 360). As examples, the first contour shape 152 is circular for a cylindrical instance of the component 360 (e.g., a fuselage barrel) or is semi-circular or arcuate for a semi-cylindrical or arcuate instance of the component 360 (e.g., a fuselage barrel section). At least a first portion 230 of the actuators 132 is coupled to the first contour cradle 150. The first contour cradle 150 supports the first portion 230, which engage, support, and apply the displacements 142 to a first portion of the component 360. In one or more examples, at least some of the first portion 230 are movable relative to the first contour cradle 150.

In one or more examples, the holding structure 126 includes a second contour cradle 154. The second contour cradle 154 is spaced away from the first contour cradle 150, such as along the length 318 of the component 360 (e.g., in the longitudinal direction). The second contour cradle 154 is an example of one of the contour cradles 218. The second contour cradle 154 includes a second contour shape 158 (e.g., an instance of the contour shape 224). The second contour shape 158 at least approximates (e.g., approximately matches) the initial shape 358 of a second contoured portion of the component 360 (e.g., a second portion of the contour 340 of the component 360). As examples, the second contour shape 158 is circular for a cylindrical instance of the component 360 (e.g., a fuselage barrel) or is semi-circular or arcuate for a semi-cylindrical or arcuate instance of the component 360 (e.g., a fuselage barrel section). At least a second portion 232 of the actuators 132 is coupled to the second contour cradle 154. The second contour cradle 154 supports the second portion 232 and positions the second portion 232 relative to the component 360, such that the second portion 232 engage, support, and can apply the displacements 142 to a portion of the component 360. In one or more examples, at least some of the second portion 232 are movable relative to the second contour cradle 154.

In one or more examples, the holding structure 126 includes a first longitudinal beam 156. The first longitudinal beam 156 extends between and/or is coupled to the first contour cradle 150 and the second contour cradle 154. The first longitudinal beam 156 is an example of one of the longitudinal beams 216. The first longitudinal beam 156 includes a first longitudinal shape 160 (e.g., an instance of the longitudinal shape 226). The first longitudinal shape 160 at least approximates (e.g., approximately matches) the initial shape 358 of a first longitudinal portion of the component 360 (e.g., a first portion of the length 318 of the component 360). As examples, the first longitudinal shape 160 is straight, curved, or includes a combination of straight sections and curved sections. At least a third portion 234 of the actuators 132 is coupled to the second contour cradle 154. The first longitudinal beam 156 supports the third portion 234 and positions the third portion 234 relative to the component 360, such that the third portion 234 engage, support, and can apply the displacements 142 to a portion of the component 360. In one or more examples, at least some of the third portion 234 are movable relative to the first longitudinal beam 156.

In one or more examples, the holding structure 126 includes a third contour cradle 166. The third contour cradle 166 is spaced away from and/or is positioned between the first contour cradle 150 and the second contour cradle 154, such as along the length 318 of the component 360 (e.g., in the longitudinal direction). The third contour cradle 166 is an example of one of the contour cradles 218. The third contour cradle 166 includes a third contour shape 168 (e.g., an instance of the contour shape 224). The third contour shape 168 at least approximates (e.g., approximately matches) the initial shape 358 of a third contoured portion of the component 360 (e.g., a third portion of the contour 340 of the component 360). As examples, the third contour shape 168 is circular for a cylindrical instance of the component 360 (e.g., a fuselage barrel) or is semi-circular or arcuate for a semi-cylindrical or arcuate instance of the component 360 (e.g., a fuselage barrel section). At least a fourth portion 236 of the actuators 132 is coupled to the third contour cradle 166. The third contour cradle 166 supports the fourth portion 236 and positions the fourth portion 236 relative to the component 360, such that the fourth portion 236 engage, support, and can apply the displacements 142 to a portion of the component 360. In one or more examples, at least some of the fourth portion 236 are movable relative to the third contour cradle 166.

In one or more examples, the third contour cradle 166 is movable relative to the first contour cradle 150 and the second contour cradle 154, such as along the length 318 of the component 360. In one or more examples, the third contour cradle 166 is coupled to the first longitudinal beam 156 and is movable relative to (e.g., along) the first longitudinal beam 156. Movement of the third contour cradle 166 along the first longitudinal beam 156 and, for example, between the first contour cradle 150 and the second contour cradle 154, enables the third contour cradle 166 and, thus, the fourth portion 236 to be selectively positioned relative to the component 360, such as at desired instances of the select first locations 320.

In one or more examples, the holding structure 126 includes a second longitudinal beam 162. The second longitudinal beam 162 extends between and/or is coupled to the first contour cradle 150 and the second contour cradle 154. The second longitudinal beam 162 is an example of one of the longitudinal beams 216. The second longitudinal beam 162 includes a second longitudinal shape 164 (e.g., an instance of the longitudinal shape 226). The second longitudinal shape 164 at least approximates (e.g., approximately matches) the initial shape 358 of a second longitudinal portion of the component 360 (e.g., a second portion of the length 318 of the component 360). As examples, the second longitudinal shape 164 is straight, curved, or includes a combination of straight sections and curved sections. At least a fifth portion 238 of the actuators 132 is coupled to the second longitudinal beam 162. The second longitudinal beam 162 supports the fifth portion 238 and positions the fifth portion 238 relative to the component 360, such that the fifth portion 238 engage, support, and can apply the displacements 142 to a portion of the component 360. In one or more examples, at least some of the fifth portion 238 are movable relative to the second longitudinal beam 162.

In one or more examples, the second longitudinal beam 162 is angularly spaced away from the first longitudinal beam 156. In one or more examples, second longitudinal beam 162 is diametrically opposite the first longitudinal beam 156. In one or more examples, the third contour cradle 166 is also coupled to the second longitudinal beam 162 and is movable relative to (e.g., along) the second longitudinal beam 162.

In one or more examples, the holding structure 126 can include additional instances of (e.g., any suitable number of) the contour cradles 218 and/or the longitudinal beams 216, depending, for example, on the size, dimensions, shapes, etc. of the component 360.

In one or more examples, the holding structure 126 includes a first index cradle 170. The first index cradle 170 is spaced away from and/or is positioned between the first contour cradle 150 and the second contour cradle 154, such as along the length 318 of the component 360 (e.g., in the longitudinal direction). In one or more examples, the first index cradle 170 is positioned proximate to or is associated with the first contour cradle 150. In one or more examples, the first index cradle 170 is coupled to the mobile platform 138. The first index cradle 170 is an example of one of the index cradles 220. The first index cradle 170 includes a first index shape 240 (e.g., an instance of the index shape 228). The first index shape 240 at least approximates (e.g., approximately matches) the initial shape 358 of a contoured portion of the component 360 (e.g., a portion of the contour 340 of the component 360). As examples, the first index shape 240 is circular for a cylindrical instance of the component 360 (e.g., a fuselage barrel) or is semi-circular or arcuate for a semi-cylindrical or arcuate instance of the component 360 (e.g., a fuselage barrel section). The first index cradle 170 initially supports the component 360 before engagement by the actuators 132 and indexes (e.g., appropriately positions) the component 360 relative to first contour cradle 150 and/or the actuators 132 before engagement by the actuators 132. In one or more examples, the first index cradle 170 is movable relative to the first contour cradle 150 and/or the second contour cradle 154 to selectively engage and disengage the component 360. As an example, the component 360 is initially placed on and is supported by the first index cradle 170. After engagement by the actuators 132, the first index cradle 170 moves (e.g., retracts) relative to the first contour cradle 150 and relative to the component 360 such that the component 360 is engaged and supported only by the actuators 132. Disengagement of the first index cradle 170 after engagement by the actuators 132 removes or eliminates any uncontrolled loading on the component 360.

In one or more examples, the holding structure 126 includes a second index cradle 222. The second index cradle 222 is spaced away from the first index cradle 170 and/or is positioned between the first contour cradle 150 and the second contour cradle 154, such as along the length 318 of the component 360 (e.g., in the longitudinal direction). In one or more examples, the second index cradle 222 is positioned proximate to or is associated with the second contour cradle 154. In one or more examples, the second index cradle 222 is coupled to the mobile platform 138. The second index cradle 222 is an example of one of the index cradles 220. The second index cradle 222 includes a second index shape 242 (e.g., an instance of the index shape 228).

The second index shape 242 at least approximates (e.g., approximately matches) the initial shape 358 of a contoured portion of the component 360 (e.g., a portion of the contour 340 of the component 360). The second index cradle 222 initially supports the component 360 before engagement by the actuators 132 and indexes (e.g., appropriately positions) the component 360 relative to second contour cradle 154 and/or the actuators 132 before engagement by the actuators 132. In one or more examples, the second index cradle 222 is movable relative to the first contour cradle 150 and/or the second contour cradle 154 to selectively engage and disengage the component 360. As an example, the component 360 is initially placed on and is supported by the second index cradle 222. After engagement by the actuators 132, the second index cradle 222 moves (e.g., retracts) relative to the second contour cradle 154 and relative to the component 360 such that the component 360 is engaged and supported only by the actuators 132. Disengagement of the second index cradle 222 after engagement by the actuators 132 removes or eliminates any uncontrolled loading on the component 360.

In the illustrative examples, the holding structure 126, including the contour cradles 218 and the longitudinal beams 216, holds the actuators 132 in positions 244 relative to the component 360. For example, each one of the actuators 132 (e.g., actuator 128) has a position 296 relative to the holding structure 126 and, thus, the component 360. In one or more examples, each one of the positions 244 corresponds to one of the select locations 364 of the component 360. The actuators 132 apply the displacements 142 to one or more select portions 362 and/or at one of more select locations 364 of the component 360 while the component 360 is held by the holding structure 126 to change the current shape 368 of the component 360 toward the target shape 366 of the component 360.

As described above, the target shape 366 can be based on a nominal shape 370, a modified nominal shape 372 (e.g., the nominal shape 370 in which a nominal dimension 374 is replaced by a current dimension 376 as measured by the manufacturing system 100), or a current shape of another one of the components 312. Generally, the portions 362 refer to any part of the component 360 in which shape control is desired or beneficial during assembly. The select second locations 346 refer to one or more points of contact or points of application of force or displacement applied by one or more of the actuators 132.

As an example, one of the portions 362 can be a section of the circumference 324 of a cylindrical instance of the component 360 (e.g., fuselage barrel). As another example, one of the portions 362 can be an entirety of the circumference 324 of a cylindrical instance of the component 360 (e.g., fuselage barrel). As another example, one of the portions 362 can be a section or an entirety of the arc length 316 of an arcuate of semi-cylindrical instance of the component 360 (e.g., fuselage barrel section, wing panel section, etc.). As another example, one of the portions 362 can be section or an entirety of the length 318 of the component 360.

In one or more examples, each one or any one of the actuators 132 can be implemented using one or more different types of actuators. As examples, the actuators 132 include or take the form of at least one of a linear actuator, a hydraulic actuator, a pneumatic actuator, an electromechanical actuator, or some other suitable type of actuator that is capable of applying a displacement and/or a force to the component 360. As such, each one of the displacements 142 corresponds to or is associated with one of the actuators 132 and, more particularly, to an actuated state of each one of the actuators 132. In one or more examples, the actuated state refers to or includes a degree, magnitude, or dimension of extension or retraction of the linear actuator.

In one or more examples, the actuators 132 are coupleable to the component 360. For example, each one of the actuators 132 is selectively coupled to the first surface 314 of the component 360 prior to application of the displacements 142 at the select locations 364. In one or more examples, one or more of the actuators 132 is coupled to the component 360 using vacuum. In one or more examples, one or more of the actuators 132 is coupled to the component 360 using fasteners.

Figure 4:
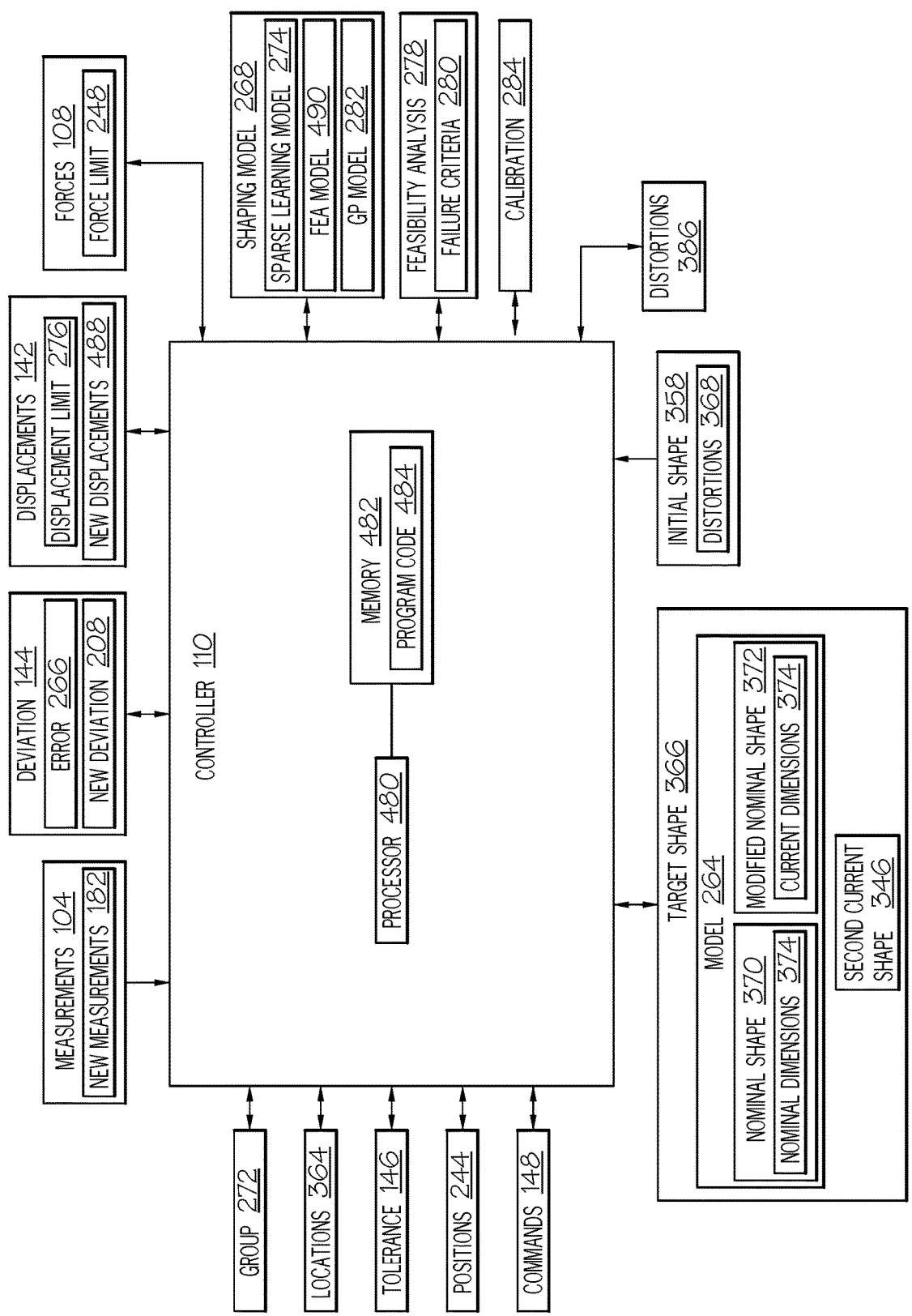
FIG. 4 is a schematic, block diagram of an example of a controller and processing flow of the manufacturing system.

In one or more examples, the displacements 142 are limited by a predetermined displacement limit 276 (FIG. 4). In one or more examples, the displacements 142 are achieved by application of forces 108 on the component 360 by the actuators 132. In one or more examples, the displacements 142 are limited by a predetermined force limit 248 (FIG. 4).

The forces 108 refer to forces needed to achieve a desired magnitude or dimension for the displacements 142, for example, as determined by the controller 110 and modified by the feedback loop 112 (FIG. 1). Generally, the forces 108 depend on the type, material composition, size, geometry, thickness, etc. of the component 360.

In one or more examples, the controller 110 monitors the displacements 142 and/or the forces 108 applied to the component 360 during actuation of the actuators 132 and application of the displacements 142 to change the current shape 368 toward the target shape 366. Monitoring the displacements 142 and/or the forces 108 can be used to prevent the displacements 142 and/or the forces 108 from becoming greater in magnitude than the displacement limit 276 and/or the force limit 248, respectively, for example, as determined by design parameters. As an example, if any of displacements 142 and/or the forces 108 associated with the actuators 132 approaches or reaches the respective instance of the displacement limit 276 and/or the force limit 248 before the current shape 368 reaches the tolerance 146 of the target shape 366, actuation (e.g., further extension and, thus, further application of displacement and/or force) of one or more of the actuators 132 can be ceased before the displacement limit 276 and/or the force limit 248 is exceeded. Generally, the displacement limit 276 and/or the force limit 248 depends on material composition, size, geometry, thickness, end use or application, and the like of the component 360.

Figure 3:
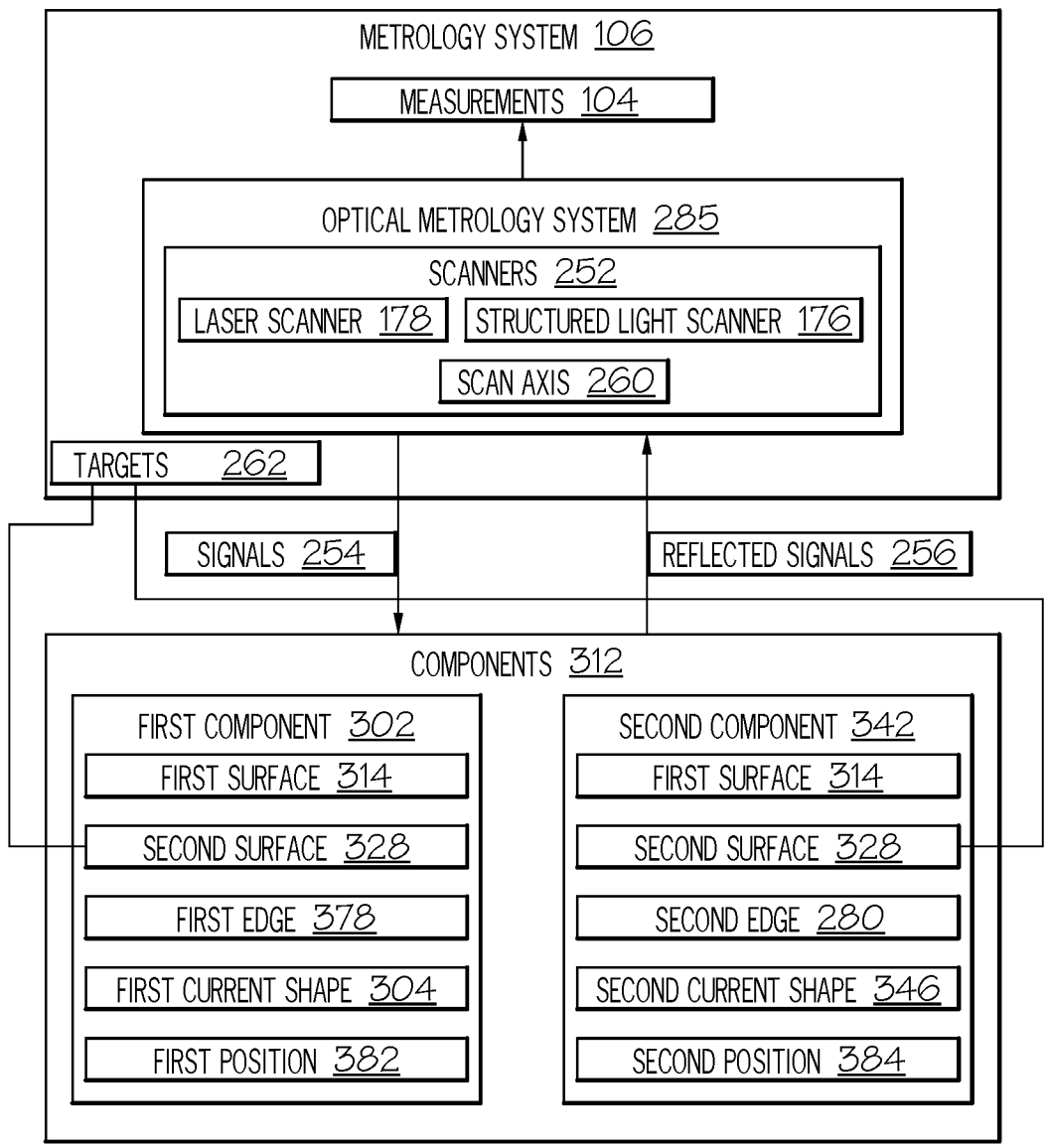
FIG. 3 is a schematic, block diagram of an example of a metrology system of the manufacturing system.

FIG. 3 schematically illustrates an example of a metrology system 106. The metrology system 106 is an example of the first metrology system 130 and/or the second metrology system 200 (FIG. 1). The metrology system 106 takes measurements 104 of one or more of the components 312. The measurements 104 are examples of the first measurements 116 and/or the second measurements 202. In one or more examples, the metrology system 106 includes a plurality of scanners 252. The scanners 252 are non-contact measurement devices that generate the measurements 104 without requiring physical contact with the components 312.

The metrology system 106, such as one or more of the scanners 252, uses signals 254 to generate the measurements 104. The signals 254 include any suitable measurable signal, such as at least one of light, structured light, laser light, infrared signals, radio frequency signals, or other suitable types of signals. In one or more examples, the scanners 252 form of an optical metrology system 285. As an example, one or more of the scanners 252 include or take the form of a structured light scanner 176. As another example, one or more of the scanners 252 include or take the form of a laser scanner 178.

In one or more examples, one or more of the scanners 252 generates and transmits the signals 254. One or more of the scanners 252 then detects reflected signals 256. As examples, the reflected signals 256 take the form or reflected or returned portions of the signals 254, such as returned light, returned structured light, returned laser light, returned infrared signals, returned radio frequency signals, or other suitable types of returned signals.

In one or more examples, one or more of the scanners 252 has a 360-degree field of view. In other words, the scanners 252 can transmit the signals 254 and detect the reflected signals 256 about 360 degrees. In this manner, transmission and detection can be performed without moving, realigning, or otherwise changing the position of any one of the scanners while transmitting the signals 254 and/or detecting the reflected signals 256.

In one or more examples, one or more of the scanners 252 is rotatable about a scan axis 260 to achieve a 360-degree field of view. In other words, the scanners 252 rotate about the scan axis 260 to transmit the signals 254 and detect the reflected signals 256 about 360 degrees.

In one or more examples, the metrology system 106 is self-referencing. In being self-referencing, absolute positioning is not needed to obtain a desired resolution in generating the measurements 104. The desired resolution can be obtained without any dependency on an absolute positioning of the scanners 252.

In one or more examples, the metrology system 106 includes a plurality of targets 262. In one or more examples, the targets 262 are reflective structures that are configured to reflect the signals 254 that are transmitted by the scanners 252 and detected to generate the measurements 104. In one or more examples, the targets 262 are coupled or otherwise disposed on the second surface 328 (e.g., interior surface) of one of the components 312. As examples, the targets 262 can include reflective tape, a tooling ball, a physical feature on one of the components 312, or some other suitable target. In other words, the targets 262 can be attached to any of the components 312, can be an already present as part of any of the components 312 as manufactured, or some combination thereof.

In other examples, one or more portions of any one of the components 312 can reflect the signals 254 that are transmitted by the scanners 252 and detected to generate the measurements 104. As an example, the scanners 252 can direct the signals 254 at the second surface 328 of any one of the components 312 and the second surface 328 can return the reflected signals 256 back to the scanners 252.

In one or more examples, one or more of the scanners 252 are used to generate the measurements 104 for one the components 312, such as the first component 302. In these examples, one or more of the scanners 252, such as the structured light scanner 176, can be used to generate the measurements 104 of the first current shape 304 of the first component 302.

In one or more examples, one or more of the scanners 252 are used to generate the measurements 104 for two or more of the components 312, such as the first component 302 and the second component 342. In these examples, one or more of the scanners 252, such as the structured light scanner 176, can be used to generate the measurements 104 of the first current shape 304 of the first component 302 and the second current shape 326 of the second component 342. Additionally, in these examples, one or more of the scanners 252, such as the laser scanner 178, can be used to generate the measurements 104 of the first position 382 of the first component 302 and a second position 384 of the second component 342. The measurements 104 of the first position 382 and the second position 384 can be used by the controller 110 to appropriately align a first edge 378 of the first component 302 and a second edge 380 of the second component 342. For example, the commands 148 sent to the actuators 132 by the controller 110 can direct the actuators 132 to apply the displacements 142 that align the first edge 378 of the first component 302 and the second edge 380 of the second component 342, for example, to within the tolerance 146.

In one or more examples, the metrology system 106 is configured to operate automatically. As examples, the metrology system 106 takes the measurements 104 continuously, periodically, or in response to an event, such as upon detection of changes to the current shape 368 of the component 360. In one or more examples, the metrology system 106 receives a program, control file, or other information and operates to take the measurements 104.

FIG. 4 schematically illustrates an example of the controller 110 and an example of a data flow process for shaping the component 360. In one or more examples, the controller 110 receives the measurements 104 from the metrology system 106. In one or more examples, the controller 110 uses the measurements 104 to determine the current shape 368 of the component 360.

In one or more examples, the controller 110 determines the target shape 366. In one or more examples, the target shape 366 is determined from a model 264 of the component 360. For example, the model 264 is a computer aided design (CAD) model of the component 360. In one or more examples, the model 264 includes the nominal shape 370 of the component 360 having the nominal dimensions 374. In one or more examples, the model 264 includes the modified nominal shape 372 of the component 360 having the current dimensions 376. In other examples, the target shape 366 is determined from the shape of the second current shape 326 of one of the components 312 (e.g., the second component 342) to which the components 312 (e.g., the first component 302) is to be joined.

In one or more examples, the controller 110 uses the measurements 104 to determine the deviations 144 between the current shape 368 and the target shape 366. In one or more examples, the deviations 144 between the current shape 368 and the target shape 366 is standard error 266 between the current shape 368 and the target shape 366.

In one or more examples, the controller 110 determines the displacements 142 to be applied to the component 360. Additionally, in one or more examples, the controller 110 also determines a selected group 272 of the actuators 132 to apply the displacements 142. Generally, the group 272 of the actuators 132 refers to or includes a fixed number of or select ones of the actuators 132 that apply the displacements 142. Additionally, in one or more examples, the controller 110 further determines the select locations 364 at which to apply the displacements 142.

The displacements 142, the select group 272 of the actuators 132, and/or the select locations 364 can be determined or calculated using any one or more of a number of different modelling or numerical techniques. In one or more examples, the controller 110 uses a shaping model 268 for the component 360 that determines how different instances of the displacements 142 at different instances of the select locations 364 affect the current shape 368 of the component 360. In one or more examples, the shaping model 268 is an analytical model or quantitative shaping algorithm. In one or more examples, the shaping model 268 is a finite element model or implements a finite element analysis of the component 360.

Based on the determination of the displacements 142, the group 272 of the actuators 132, and/or the select locations 364, the controller 110 generates the commands 148. The commands 148 are sent to the shaping apparatus 250 holding the component 360 and direct the actuators 132 to apply the displacements 142 at the select locations 364.

The present disclosure recognizes that shape control can be necessary in the assembly of certain types or applications of the structure 300, such as aerospace structures (e.g., the fuselage 1218). In an aerospace example, shape control may be needed due to dimensional variations between fabricated fuselage barrels 334 and/or fuselage barrel sections 336. The manufacturing system 100 provides for shape adjustment and control using the actuators 132 to apply the displacements 142 (e.g., by pushing or pulling) at the select locations 364 of the component 360. The present disclosure recognizes that the select locations 364 at which the displacements 142 are applied and/or the positions 244 of the actuators 132 relative to the component 360 impact the effectiveness of the shaping process. The present disclosure also recognizes that there is a physical limit to the number of the actuators 132 that can be used for shape control purposes.

The present disclose recognizes the importance of determining optimal actuator placement. For the purpose of the present disclosure, optimal actuator placement refers to at least one of optimal placement or positioning of the actuators 132 and/or the optimal placement or selection of the select locations 364. Thus, in one or more examples, the manufacturing system 100 and manufacturing method (e.g., method 1000 of FIG. 25) that implements the manufacturing system 100 provides techniques for determining at least one of the group 272 of the actuators 132 selected apply the displacements 142, the positions 244 of the actuators 132 relative to the component 360, and/or the select locations 364 at which the displacements 142. In one or more examples, these determinations are made using a sparse learning model 274. The sparse learning model 274 uses a corresponding parameter estimation algorithm.

The present disclosure recognizes that determining effective and optimal actuator placement is challenging, for example, due to initial shape distortions of components varying from one component to another and that optimal actuator placement may change based on different initial shape distortions. Additionally, the shape of a component after shape adjustment may not be directly derived from mechanics due to the compliant and anisotropic property of complex structures. In one or more examples, the sparse learning model 274 approximates such parameters using a finite element analysis (FEA) model 490 or method that calculates deformation after applying the displacements 142. In one or more examples, the sparse learning model 274 is adapted to link changes to the current shape 368 (e.g., shape corrections) with the displacements 142 and/or the forces 108 applied by the actuators 132. The sparse learning model 274 minimizes the weighted mean square of adjusted shape deviations (WMSDs) to obtain the optimal actuator placement for a given number of the actuators 132. Additionally, the sparse learning model 274 utilizes an algorithm to estimate parameters of the proposed model by integrating a binary search algorithm and an Alternating Direction Method of Multipliers (ADMM) algorithm.

In one or more examples, the controller 110 uses the sparse learning model 274 to determine how different numbers and locations of the displacements 142 affect the current shape 368 of the component 360. For example, the sparse learning model 274 considers the initial shape 358 of the component 360 and distortions 386 in the initial shape 358 (e.g., due to gravity or other handling loads) and reduces the weighted mean square of adjusted shape deviations (WMSD) to determine the group 272 of the selected actuators 132, the positions 244 (e.g., relative placement) of the actuators 132, and/or the select locations 364 at which the displacements 142 are to be applied. In one or more examples, the sparse learning model 274 is an analytical model or quantitative sparse learning algorithm. In one or more examples, the sparse learning model 274 is an implementation of the shaping model 268.

In one or more examples, the actuators 132 are uniformly distributed around the contour 340 of the component 360 (e.g., around the circumference of a fuselage barrel). In other examples, the actuators 132 are non-uniformly distributed or are dispersed around the contour 340 of the component 360 (e.g., around the circumference of a fuselage barrel) according to the results of the sparse learning model 274. In these examples, the sparse learning model 274 establishes a relationship between the shape correction and actuator displacements and/or forces applied to the component 360. By minimizing the WMSD, the sparse learning model 274 can calculate the optimal displacements and/or forces applied by each of the actuator 132 for shape control and then assembly. In other words, the sparse learning model 274 provides optimal actuator placement for shape control, which considers the distortions 386 in the initial shape 358, considers the feasibility of the select locations 364 and/or positions 244 of actuators 132, and links the displacements 142 and/or forces 108 with the WMSD of the component 360. To estimate the model parameters efficiently, the sparse learning algorithm integrates the binary search and the ADMM algorithm. In one or more examples, after obtaining the optimal actuator placement, optimal displacements and/or optimal forces can be obtained by minimizing the WMSD.

The present disclosure also recognizes that in order to prevent potential damage to a component during the shaping process, it may be necessary to limit the displacements and/or forces applied to the component such that the displacements and/or forces do not exceed a maximum magnitude. In one or more examples, the controller 110 determines the displacements limit 276. The displacement limit 276 refers to a limit to or a maximum allowable dimension of the displacements 142 that can be applied to the component 360. In one or more examples, the controller 110 determines the force limit 248. The force limit 248 refers to a limit to or a maximum allowable magnitude of the forces 108 that can be applied to the component 360.

In one or more examples, the displacement limit 276 and/or the force limit 248 are determined based on a feasibility analysis 278. In one or more examples, the feasibility analysis 278 incorporates and/or analyzes engineering failure criteria 280 of the component 360. In one or more examples, the feasibility analysis 278 is implemented by the shaping model 268. As an example, the feasibility analysis 278 can utilize the output or results from the sparse learning model 274, the FEA model 490, or a combination thereof to determine the failure criteria 280 of the component 360 and, thus, the displacement limit 276 and/or the force limit 248. In an example, the parameters utilized and/or analyzed during the feasibility analysis 278 performed by the shaping model 268 include, but are not limited to, material properties, ply design (e.g., for a composite component), configuration of the holding structure 126, and the positions 244 of the actuators 132.

In one or more examples, the shaping model 268 and/or the shaping algorithm implemented by the shaping model 268 utilize active learning techniques that consider uncertainties in displacement and/or force application for shape control of the components 312. In one or more examples, the controller 110 determines the displacements 142, the displacement limit 276, the forces 108, and/or the force limit 248 using application of a Gaussian Process (GP) model 282, such as a Gaussian Regression Process or a Gaussian Process Progression Model (GPPM). Generally, the GP model 282 refers to an active, machine learning process.

As an example, the GP model 282 is used to modify the displacements 142 and/or the forces 108 based on historical variations between the initial shape 358 of the component 360, the distortions 386 in the initial shape 358, and the target shape 366. In one or more examples, the GP model 282 is an active learning algorithm. In one or more examples, the GP model 282 is an implementation of the shaping model 268.

In an example, the GP model 282 is an active learning model that implements an iterative data selection algorithm for maximizing information acquisition and improving model performance with limited training samples. The GP model 282 considers uncertainties in the component 360, uncertainties in the actuators 132, and uncertainties in the model. The GP model 282 estimates these uncertainties, for example, by introducing a nugget effect. The GP model 282 then analysis these uncertainties as applied to the shaping process. As an example, the GP model 282 analyzes variances between historical samples and estimated samples of the uncertainties. The GP model 282 then provides a generalized least-square estimation of the uncertainty parameters. The GP model 282 implements the active learning algorithm to estimate model parameters for the GP model 282 that considers the uncertainties by maximizing a log-likelihood function. To evaluate the performance of the active learning algorithms, the GP model 282 utilizes three evaluation scores: (1) mean of mean absolute deviations (mean MAD); (2) maximum of mean absolute deviations (max MAD); and (3) mean square error (MSE) of cross validation (cross-validation MSE).

In one or more examples, the controller 110 applies a calibration 284 to the actuators 132. In one or more examples, the calibration 284 is determined based on differences in the displacements 142 and the forces 108. In one or more examples, the calibration 284 uses a plurality of calibration parameters, also referred to as sensible variables. The control variables are variables that can be controlled in corresponding physical implementations of the shaping process using the manufacturing system 100. The present disclosure recognizes that initial guesses of model parameters are available. These values are generally obtained using engineering design information or domain expert knowledge. These values are referred to as engineering design values. Ideally, physical properties of a component should be consistent with the engineering design values. The present disclosure also recognizes that calibration of model parameters may suffer from variations in dimensionality when the input dimension of the calibration parameters is relatively high. It is reasonably assumed that most calibration parameters can be set at the engineering design values, because the quality of the components is generally well controlled. Thus, only a small number of the model parameters need to be adjusted. These variables are referred to as sensible calibration variables, or abbreviated as the sensible variables. In one or more examples, the calibration 284 is implemented by the shaping model 268. As an example, output or results from the sparse learning model 274, the FEA model 490, or a combination thereof can be used to determine the calibrations 284 by controlling the sensible variables of the calibration parameters.

Figure 5:
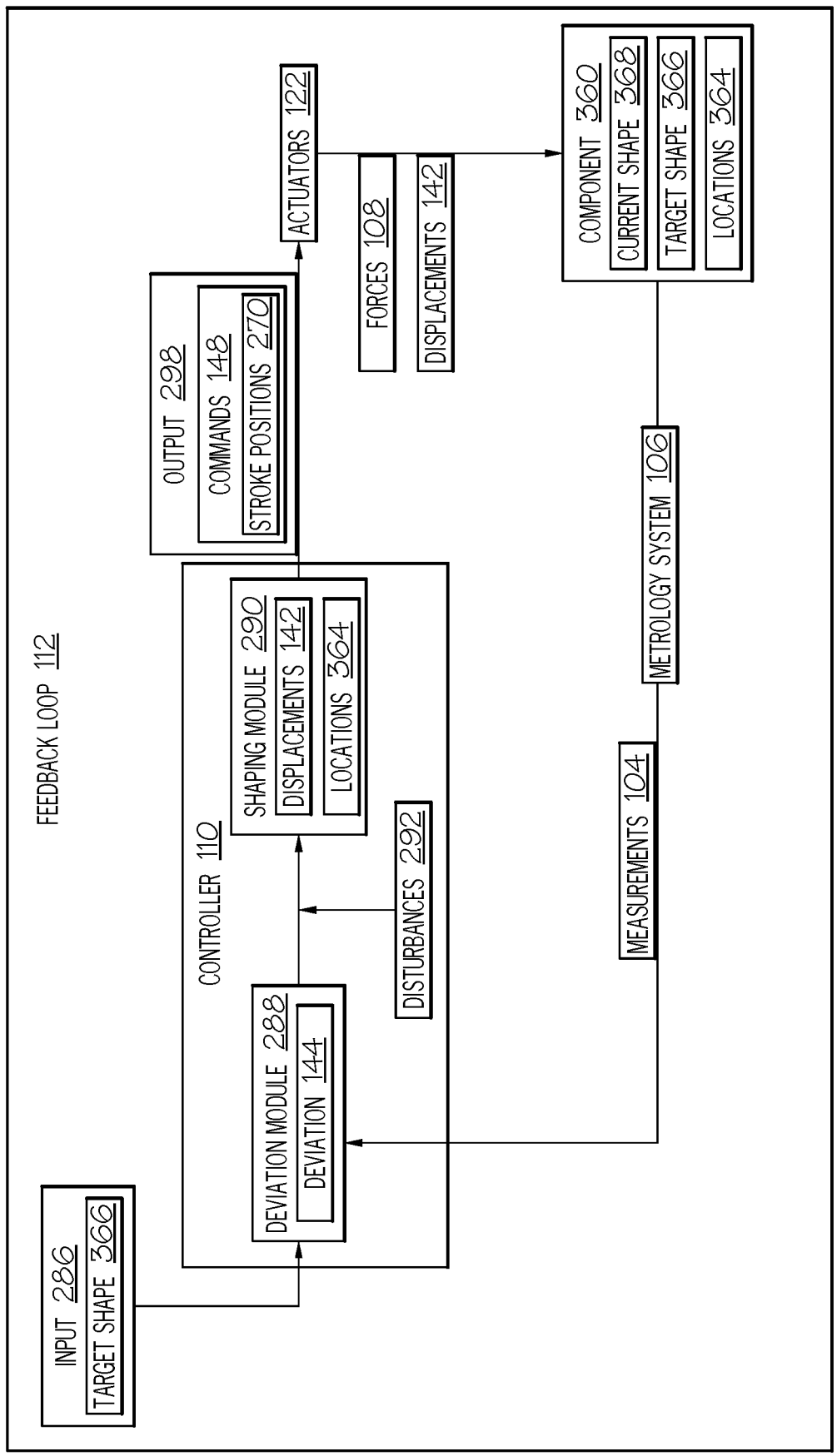
FIG. 5 is a schematic, block diagram of an example of a feedback loop of the manufacturing system.

FIG. 5 schematically illustrates an example of the feedback loop 112 used during the shaping process. In one or more examples, the feedback loop 112 includes the controller 110, the metrology system 106, and the actuators 132.

In one or more examples, an input 286 is provided to the controller 110. In one or more examples, the input 286 is the target shape 366. The metrology system 106 takes the measurements 104 of the current shape 368 of the component 360. The measurements 104 are sent to the controller 110.

In one or more examples, the controller 110 determines the deviation 144 from the input 286 (e.g., the target shape 366) and the measurements 104 (e.g., the current shape 368). In one or more examples, the controller 110 includes a deviation module 288 that determines (e.g., calculates) the error 266 (FIG. 4) between the current shape 368 and the target shape 366.

In one or more examples, the controller 110 uses the deviation 144 to determine the displacements 142 to be applied to the component 360. In one or more examples, the displacements 142 applied to the component 360 correspond to stroke positions 270 of the actuators 132 as commanded by controller 110. The displacements 142 are those that should be applied to the component 360 to change the current shape 368 toward the target shape 366. In one or more examples, the controller 110 also determines the select locations 364 of the component 360 where the displacements 142 should be applied.

In one or more examples, the controller 110 includes a shaping module 290 that determines the displacements 142 based on the deviation 144. In one or more examples, the shaping module 290 determined the stroke positions 270 of the actuators 132 that correspond to the displacements 142 needed to change the current shape 368 toward the target shape 366. In one or more examples, the shaping module 290 also determines the select locations 364 where the displacements 142 should be applied. In one or more examples, the shaping module 290 implements or uses the shaping model 268 (FIG. 4).

In one or more examples, when determining the displacements 142, the shaping module 290 also analyzes disturbances 292 applied to the component 360. Examples of the disturbances 292 include, but are not limited to, gravity, condition of assembly, internal stresses, and the like.

In one or more examples, the controller 110 (e.g., the shaping module 290) compares the measurements 104 for the current shape 368 to parameters for the target shape 366 to determine whether displacements 142 should be applied to component 360 and/or at which of the select locations 364 the displacement 142 should be applied.

In one or more examples, the controller 110 generates the commands 148 and sends the commands 148 to the actuators 132. In one or more examples, the commands 148 and, thus, actuation of the actuators 132 to the stroke positions 270 are the output 298 of the feedback loop 112. The actuators 132 apply the displacements 142 to the component 360, for example, at the select locations 364. Application of the displacements 142 changes the current shape 368 toward the target shape 366.

The metrology system 106 again takes the measurements 104 of the current shape 368 of the component 360 after the displacements 142 have been applied. The measurements 104 are sent to the controller 110 (e.g., the deviation module 288) for determination of the deviation 144 to form or complete the feedback loop 112. In the illustrated example, the feedback loop 112 is a closed loop that provides for incremental changes in the current shape 368 of the component 360 until the current shape 368 is within the tolerance 146 of the target shape 366.

FIGS. 6-17 illustrate examples of the manufacturing system 100. In the illustrated examples, the manufacturing system 100 is used for assembling the fuselage 1218 of the aircraft 1200 (FIG. 27). As an example, the manufacturing system 100 shapes one or more of the fuselage barrels 334 (FIG. 1) to join the fuselage barrels 334 and to assemble at least a portion of the fuselage 1218.

Figure 8:
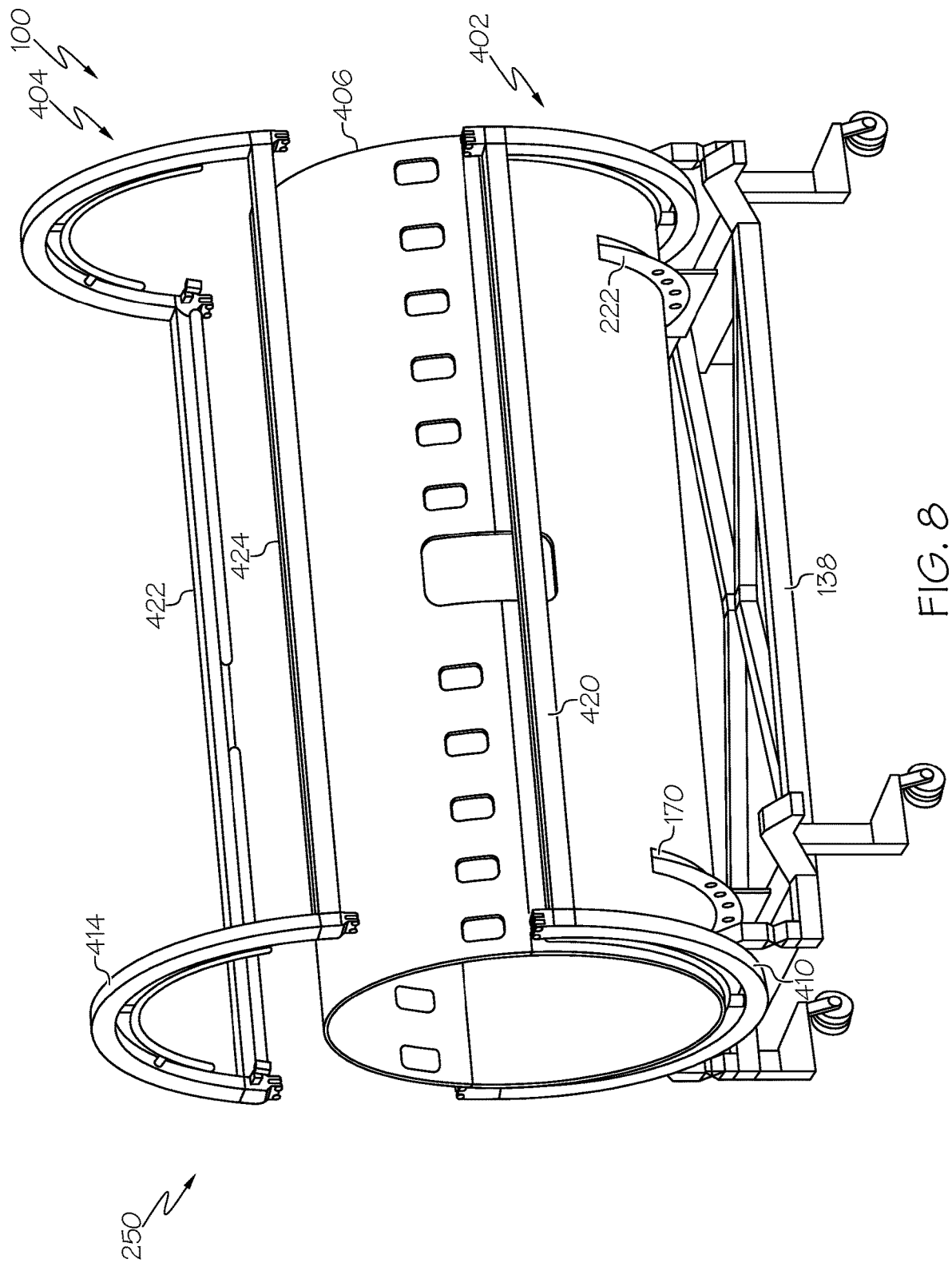
FIG. 8 is a schematic, perspective view of an example of the shaping apparatus and an example of a component of a structure partially loaded in the shaping apparatus.
Figure 9:
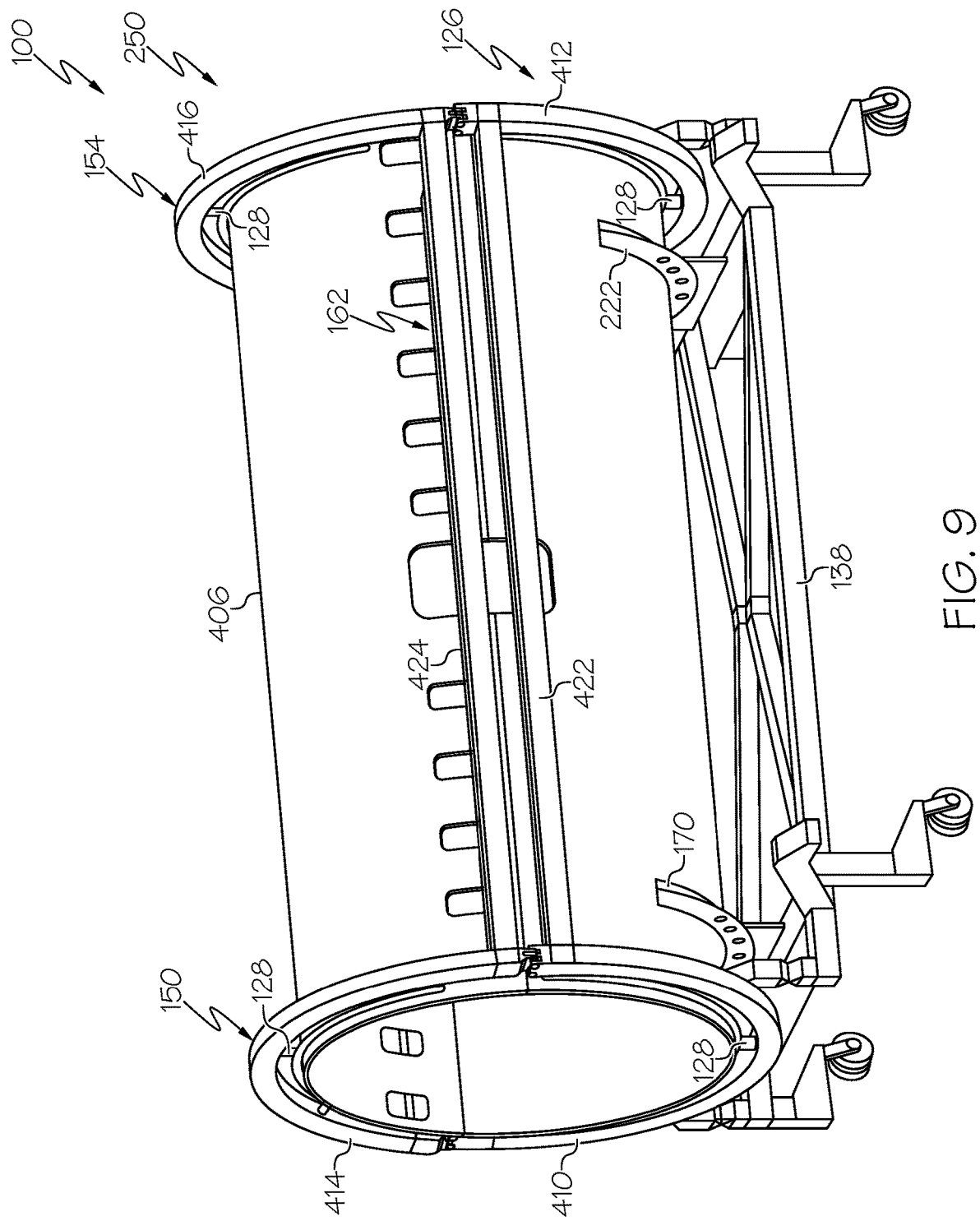
FIG. 9 is a schematic, perspective view of an example of the shaping apparatus and an example of a component loaded in the shaping apparatus.

In the examples illustrated in FIGS. 8 and 9, the component 360 takes the form of a fuselage barrel 406. The fuselage barrel 406 is an example of one of the fuselage barrels 334 (FIG. 1). In these examples, the fuselage barrel 406 is a monolithic structure that has a cylindrical shape. In these examples, the manufacturing system 100 shapes the fuselage barrel 406.

Figure 10:
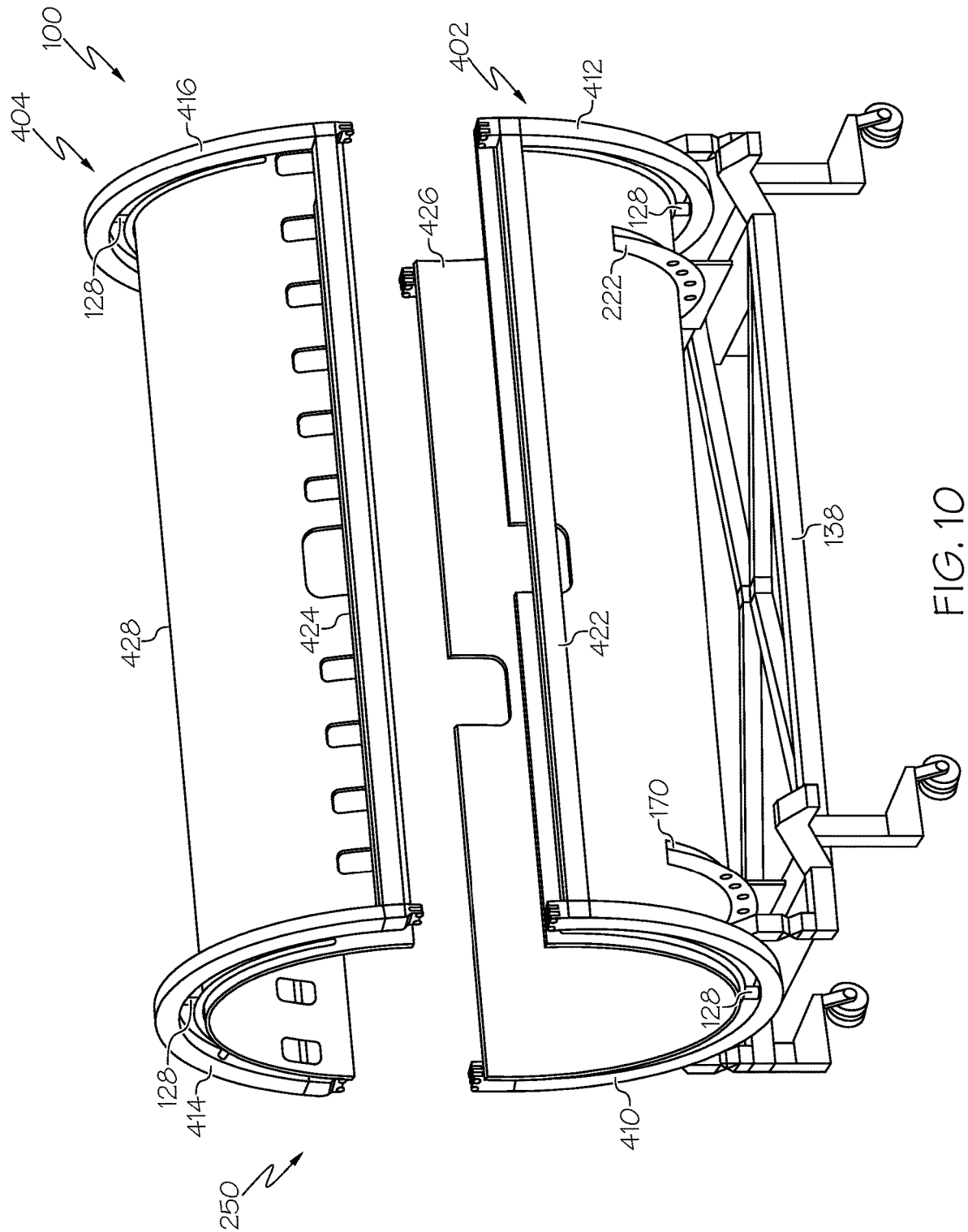
FIG. 10 is a schematic, perspective view of another example of the shaping apparatus in the open state and an example of components of a structure partially loaded in the shaping apparatus.
Figure 11:
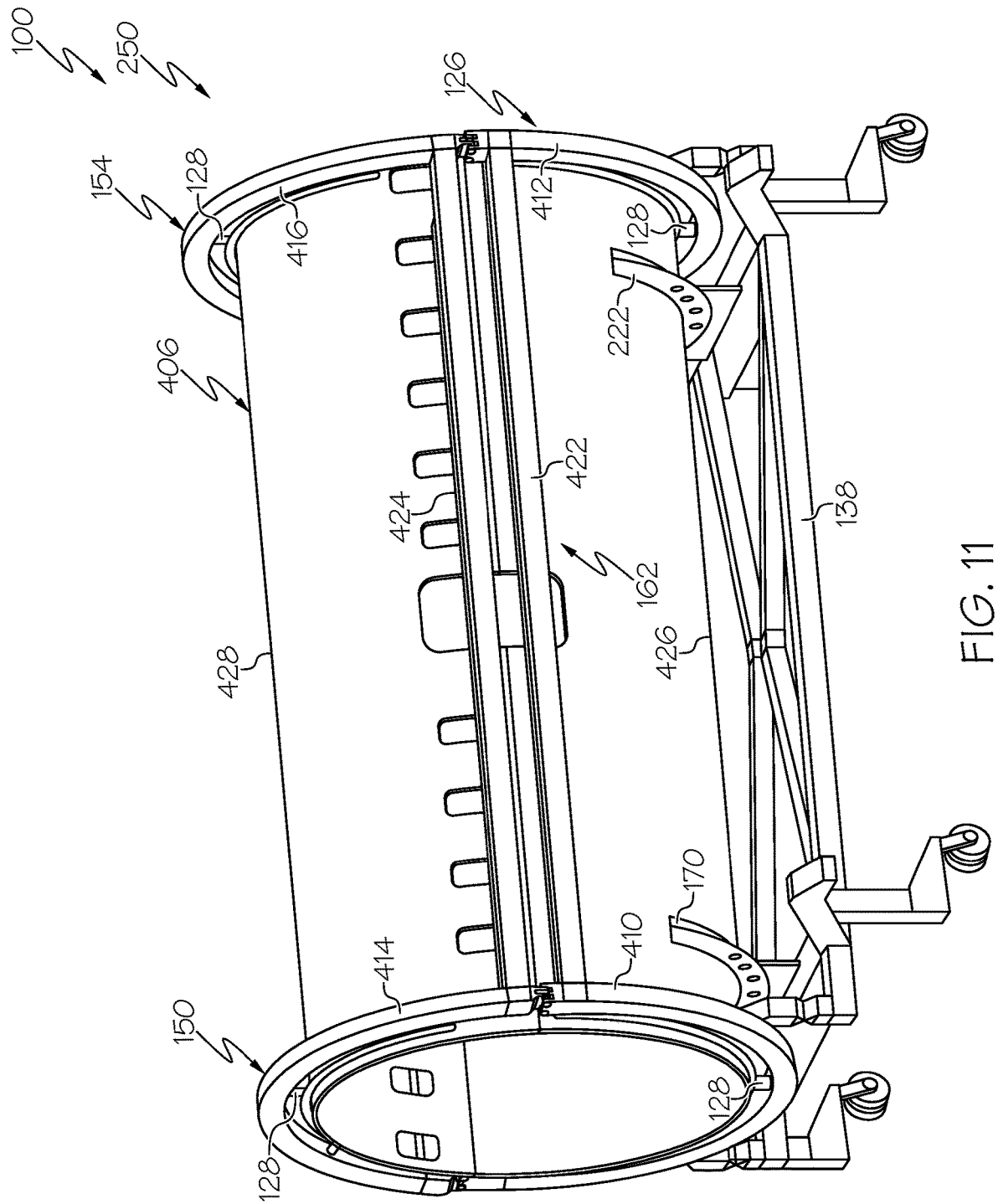
FIG. 11 is a schematic, perspective view of an example of the shaping apparatus and components of a structure loaded in the shaping apparatus.

In the examples illustrated in FIGS. 10 and 11, the components 312 take the form of a first fuselage barrel section 426 and a second fuselage barrel section 428. The first fuselage barrel section 426 and the second fuselage barrel section 428 are examples of the fuselage barrel sections 336. The first fuselage barrel section 426 and the second fuselage barrel section 428 have an arcuate shape. In these examples, the manufacturing system 100 shapes the first fuselage barrel section 426 and the second fuselage barrel section 428 and aligns the first fuselage barrel section 426 and the second fuselage barrel section 428 to join the first fuselage barrel section 426 and the second fuselage barrel section 428 and assemble the fuselage barrel 406 (e.g., one of the fuselage barrels 334). In these examples, the fuselage barrel 406 is a segmented or sectional structure that has a cylindrical shape and the manufacturing system 100 shapes the fuselage barrel 406 after shaping and joining the first fuselage barrel section 426 and the second fuselage barrel section 428.

In other non-illustrated examples, other numbers (e.g., more than two) of the fuselage barrel sections 336 can be processed by the shaping apparatus 250, for example, in addition to or in place of the first fuselage barrel section 426 and the second fuselage barrel section 428. For example, three, six, or some other number of fuselage barrel sections 336 can be held and shaped in shaping apparatus 250 with the displacements 142 applied to change the current shape 368 of the fuselage barrel 406 held in shaping apparatus 250.

In any of the above examples, at least one of the metrology system 106 and/or the controller 110 identifies a difference between the current shape 368 of the fuselage barrel 406 and the target shape 366 for the fuselage barrel 406. The shaping apparatus 250 then applies the displacements 142 and iteratively changes the displacements 142 to change the current shape 368 toward the target shape 366 until the current shape 368 of the fuselage barrel 406 is within the tolerance 146 of the target shape 366.

Figure 16:
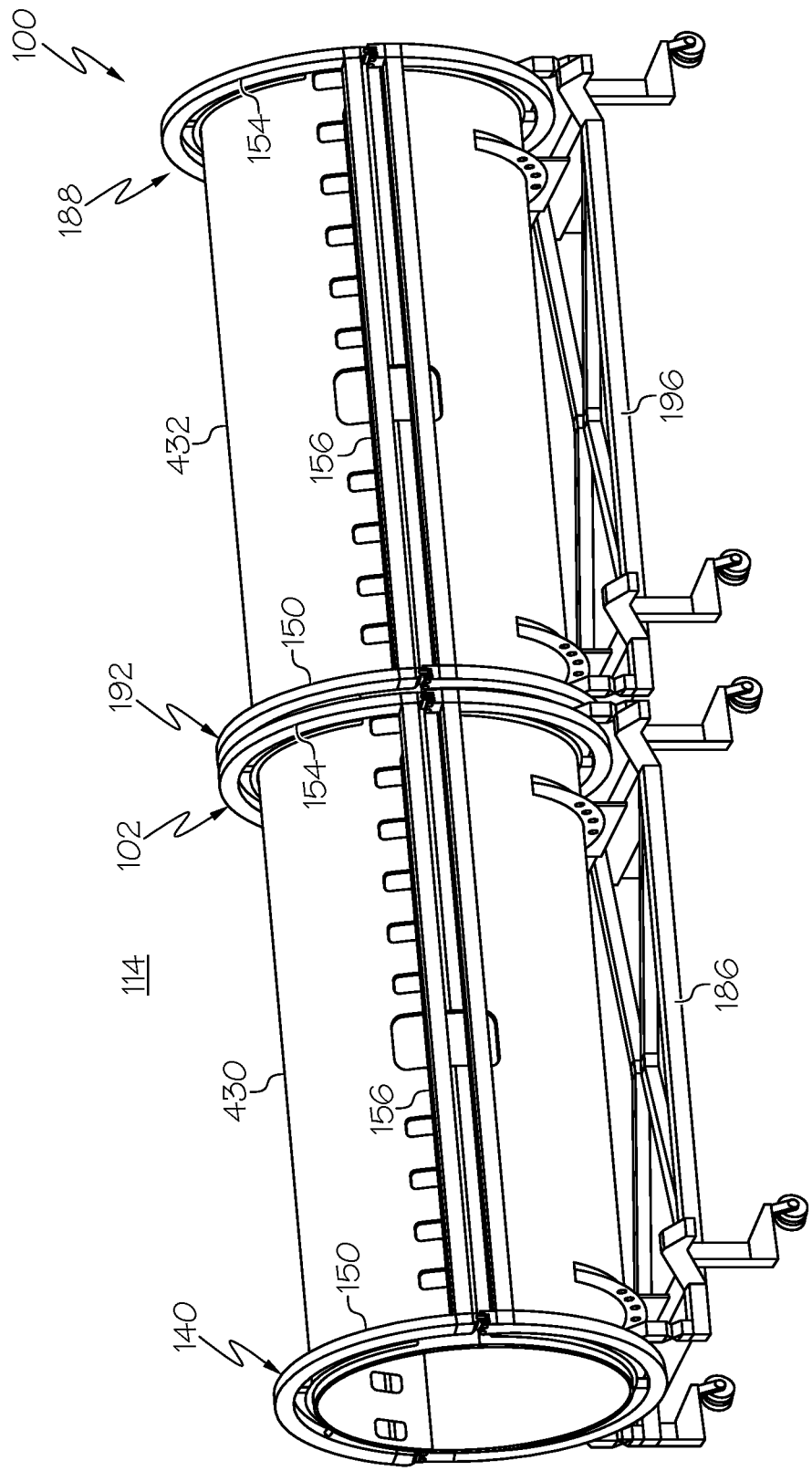
FIG. 16 is a schematic, perspective view of an example of two shaping apparatuses being used to join two components of a structure.
Figure 17:
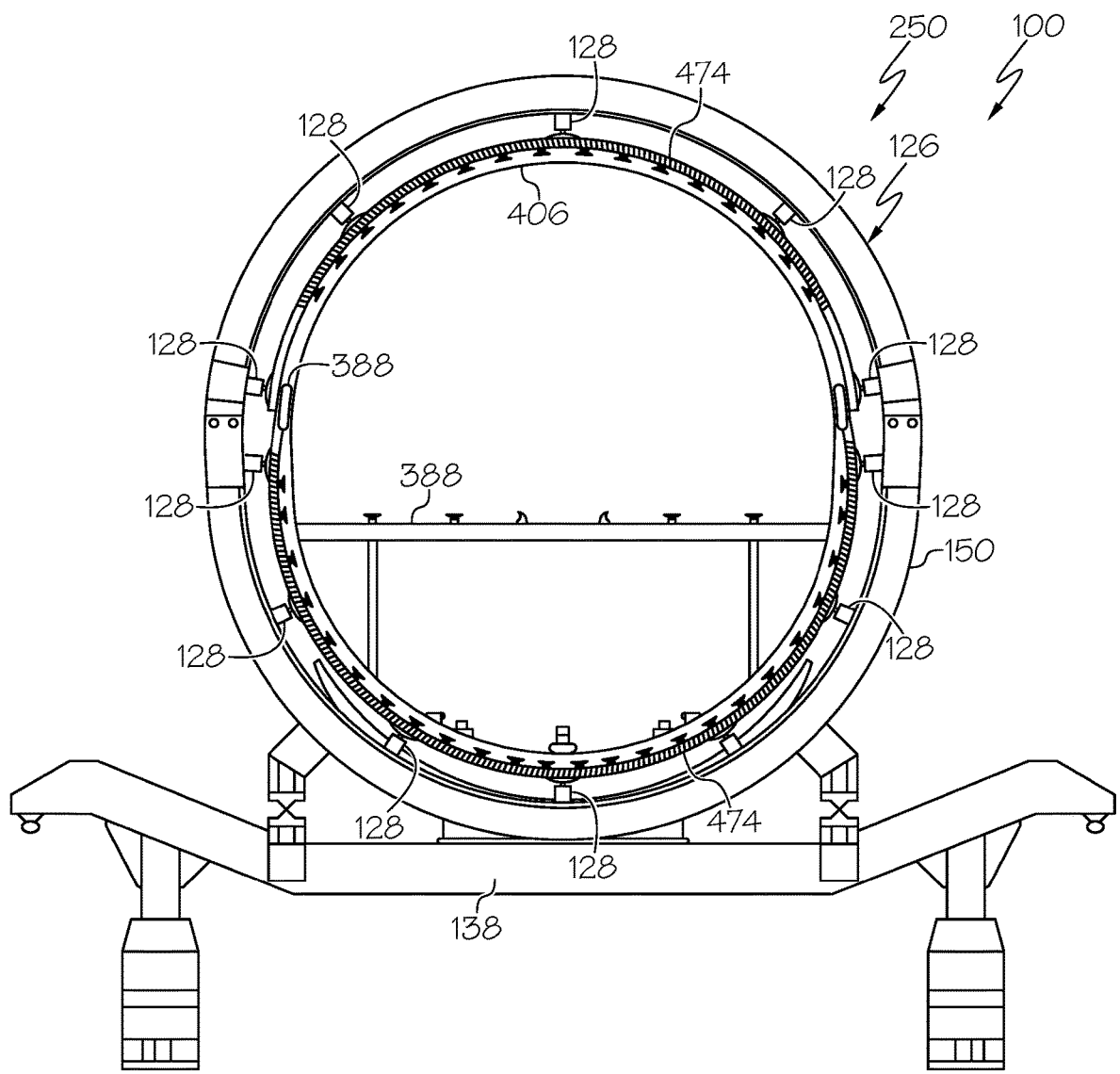
FIG. 17 is a schematic, end view of an example of the shaping apparatus.

In the examples illustrated in FIGS. 16 and 17, the manufacturing system 100 includes the first shaping apparatus 102 and the second shaping apparatus 188. The first shaping apparatus 102 and the second shaping apparatus 188 align a first fuselage barrel 430 and a second fuselage barrel 432, respectively, to join the first fuselage barrel 430 and a second fuselage barrel 432 and to assemble a portion of the fuselage 1218 (FIG. 27). The first fuselage barrel 430 and the second fuselage barrel 432 are examples of any one of the fuselage barrels 334. In one or more examples, the first fuselage barrel 430 and/or the second fuselage barrel 432 are examples of the fuselage barrel 406 (e.g., monolithic or sectional) that has a cylindrical shape (FIGS. 9 and 11).

In other non-illustrated examples, other numbers of fuselage barrels 334 can be processed by the manufacturing system 100 in addition to or in place of first fuselage barrel section 426 and the second fuselage barrel section 428. In these examples, the manufacturing system 100 includes other numbers of the shaping apparatuses 190 (FIG. 1). For example, three, six, or some other number of fuselage barrels 334 can be held and shaped by corresponding ones of the shaping apparatuses 190 with the displacements 142 being applied to one or more of the fuselage barrels 334 to change the current shapes of one or more of fuselage barrels 334 toward respective target shapes.

Figure 6:
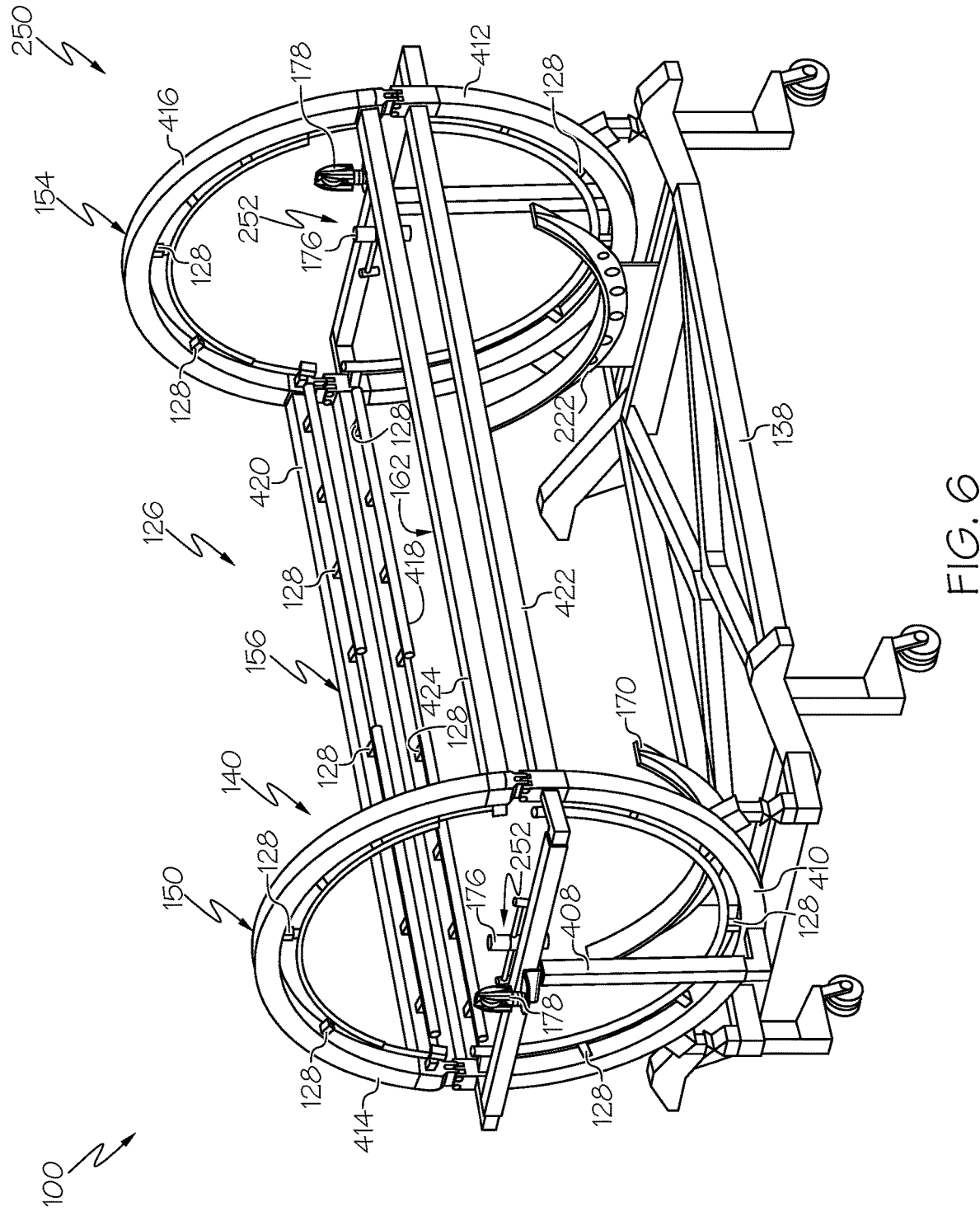
FIG. 6 is a schematic, perspective view of an example of the shaping apparatus, depicted in a closed state.
Figure 7:
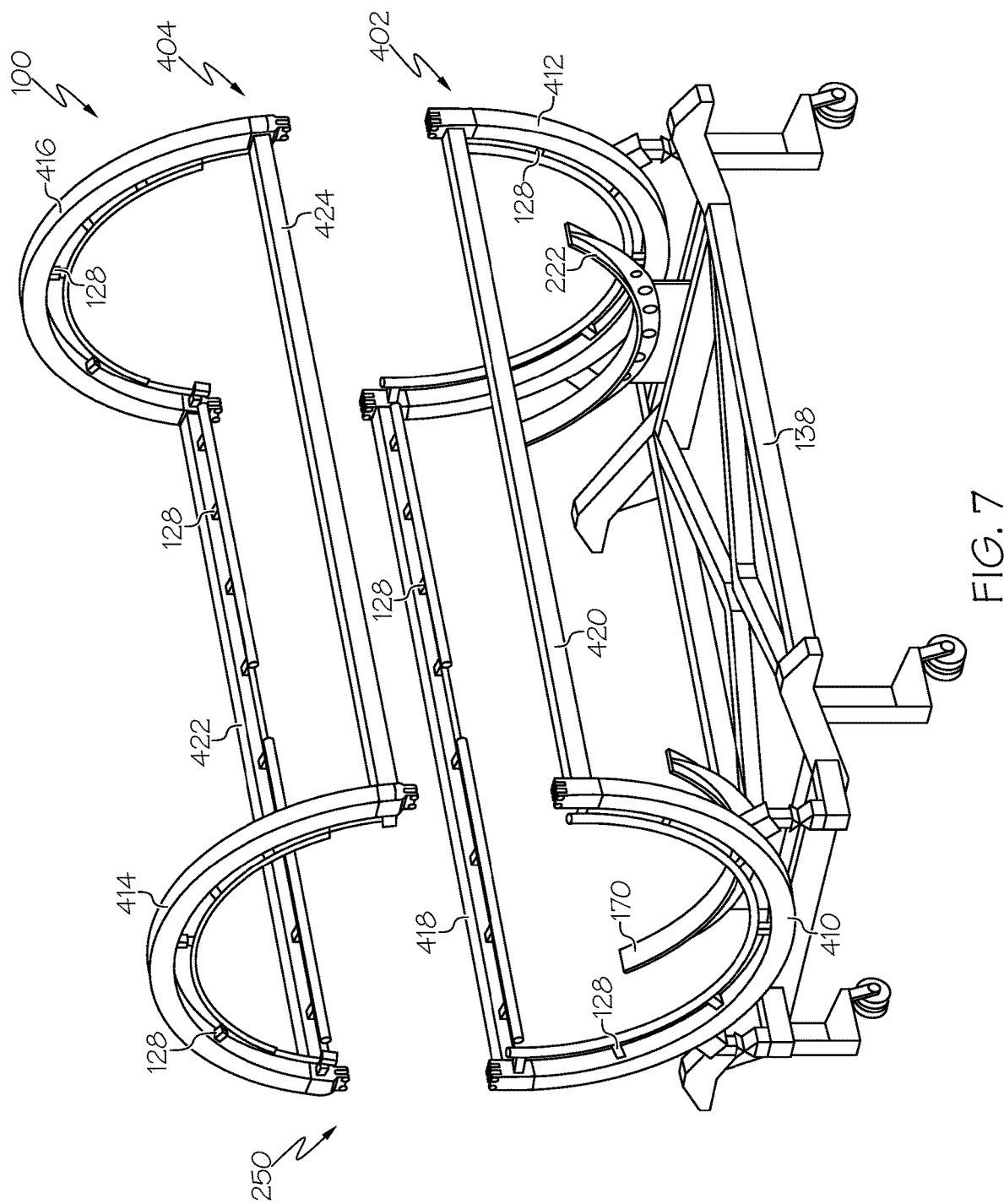
FIG. 7 is a schematic, perspective view of an example of the shaping apparatus, depicted in an open state.

Referring to FIGS. 6 and 7, in one or more examples, the manufacturing system 100 includes the shaping apparatus 250. The shaping apparatus 250 includes the holding structure 126. The holding structure 126 includes the contour cradles 218 (FIG. 2), such as the first contour cradle 150 and the second contour cradle 154. The holding structure 126 includes the longitudinal beams 216 (FIG. 2), such as the first longitudinal beam 156 and the second longitudinal beam 162. The holding structure 126 includes the index cradles 220 (FIG. 2), such as the first index cradle 170 and the second index cradle 222.

The shaping apparatus 250 includes the actuators 132 (identified as multiple instances of the actuator 128). The actuators 132 are coupled to the contour cradles 218 and to the longitudinal beams 216 of the holding structure 126. The shaping apparatus 250 includes the mobile platform 138. The holding structure 126 is coupled to and is supported by the mobile platform 138.

The manufacturing system 100 includes the metrology system 106 (FIG. 1). As illustrated in FIG. 6, the metrology system 106 includes a plurality of the scanners 252, such as two instances of the structured light scanner 176 and two instances of the laser scanner 178, which, for example, are positioned at opposing ends of the shaping apparatus 250.

Figure 14:
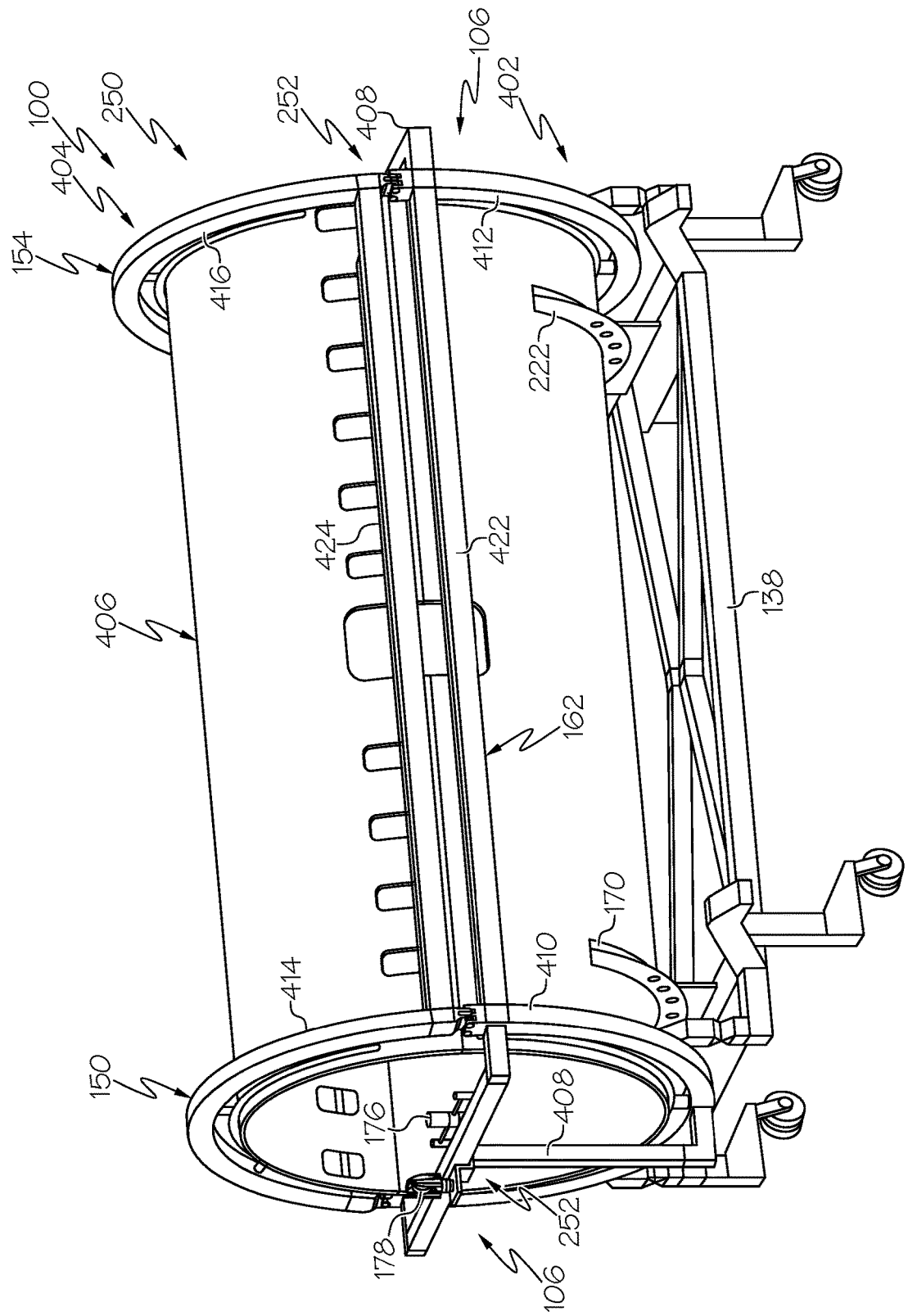
FIG. 14 is a schematic, perspective view of an example of the shaping apparatus, an example of a component loaded in the shaping apparatus, and an example of the metrology system.

In one or more examples, the metrology system 106 includes a stanchion 408. The stanchion 408 supports the scanners 252. In the illustrated example, the stanchion 408 provides support to the structured light scanner 176 and the laser scanner 178. In one or more examples, the stanchion 408 is coupled to the holding structure 126, for example, at one or both ends of the shaping apparatus 250, such that the stanchion 408 appropriately positions the scanners 252 to take the measurements 104 (FIG. 1) of the fuselage barrel 406 when loaded in the shaping apparatus 250 (e.g., as shown in FIG. 14).

In one or more examples, the holding structure 126 includes a first section 402 and a second section 404. In one or more examples, the second section 404 is movable relative to the first section 402 such that the holding structure 126, or the shaping apparatus 250, is in one of a closed state (e.g., FIG. 6) or an open state (e.g., FIG. 7). In one or more examples, the first section 402 is coupled to the mobile platform 138. In one or more examples, the second section 404 is coupled to the first section 402, such that the second section 404 is movable between the open state and the closed state. In one or more examples, the first section 402 and the second section 404, in combination, form the contour cradles 218 and the longitudinal beams 216 (FIG. 2). In one or more examples, a first portion of the actuators 132 is coupled to the first section 402. A second portion of the actuators 132 is coupled to the second section 404.

Referring to FIGS. 8 and 9, in one or more examples, the first section 402 is configured to hold and shape a first (e.g., lower) portion of the fuselage barrel 406 (e.g., the component 360). The second section 404 is configured to hold and shape a second (e.g., upper) portion of the fuselage barrel 406. Accordingly, the first section 402 may be considered a lower section of the holding structure 126 and the second section 404 may be considered an upper section of the holding structure 126.

In one or more examples, the first section 402 of the holding structure 126 includes or forms a first cradle-first section 410 of the first contour cradle 150 and a second cradle-first section 412 of the second contour cradle 154. The second section 404 of the holding structure 126 includes or forms a first cradle-second section 414 of the first contour cradle 150 and a second cradle-second section 416 of the second contour cradle 154.

In one or more examples, the first cradle-first section 410 and the first cradle-second section 414 each have an arcuate shape configured to extend around and position the actuators 132 around a portion of the circumference 324 of the fuselage barrel 406. With the holding structure 126 in the closed state (FIG. 9), the first cradle-first section 410 and the first cradle-second section 414 form the first contour cradle 150 having the contour shape 224 that is circular and configured to extend around and position the actuators 132 around an entirety of the circumference 324 of the fuselage barrel 406, for example, proximate the first end 396.

In one or more examples, the second cradle-first section 412 and the second cradle-second section 416 each have a portion of the contour shape 224 that is arcuate and configured to extend around and position the actuators 132 around a portion of the circumference 324 of the fuselage barrel 406. With the holding structure 126 in the closed state (FIG. 9), the second cradle-first section 412 and the second cradle-second section 416 form the second contour cradle 154 having the contour shape 224 that is circular and configured to extend around and position the actuators 132 around an entirety of the circumference 324 of the fuselage barrel 406, for example, proximate the second end 398.

In one or more examples, the first section 402 of the holding structure 126 includes or forms a first beam-first section 418 of the first longitudinal beam 156 and a second beam-first section 422 of the second longitudinal beam 162. The second section 404 of the holding structure 126 includes or forms a first beam-second section 420 of the first longitudinal beam 156 and a second beam-second section 424 of the second longitudinal beam 162.

In one or more examples, each one of the first beam-first section 418, second beam-first section 422, the first beam-second section 420, and the second beam-second section 424 have the longitudinal shape 226 configured to extend along at least a portion of the length 318 of the fuselage barrel 406. In one or more examples, the first beam-first section 418 and second beam-first section 422 extend between and/or are coupled to the first cradle-first section 410 and the second cradle-first section 412. The first beam-second section 420 and second beam-second section 424 extend between and/or are coupled to the first cradle-second section 414 and the second cradle-second section 416.

Referring to FIGS. 10 and 11, in one or more examples, the first section 402 of the holding structure 126 is configured to hold and shape the first fuselage barrel section 426 (e.g., the first component 302) and the second section 404 of the holding structure 126 is configured to hold and shape the second fuselage barrel section 428 (e.g., the second component 342).

In the illustrated examples, the first cradle-first section 410, the second cradle-first section 412, the first beam-first section 418, and the second beam-first section 422 hold and shape the first fuselage barrel section 426. The first cradle-second section 414, the second cradle-second section 416, the first beam-second section 420, and the second beam-second section 424 hold and shape the second fuselage barrel section 428.

In one or more examples, the first cradle-first section 410 and the second cradle-first section 412 each have the contour shape 224 that is arcuate and configured to extend along and position the actuators 132 along an entirety of the arc length 316 of the first fuselage barrel section 426. The first cradle-second section 414 and the second cradle-second section 416 each have the contour shape 224 that is arcuate and configured to extend along and position the actuators 132 along an entirety of the arc length 316 of the second fuselage barrel section 428. The first beam-first section 418 and second beam-first section 422 have the longitudinal shape 226 configured to extend along at least a portion of the length 318 of the first fuselage barrel section 426. The first beam-second section 420 and second beam-second section 424 have the longitudinal shape 226 configured to extend along at least a portion of the length 318 of the second fuselage barrel section 428.

With the holding structure 126 in the closed state (FIG. 11), the first cradle-first section 410 and the first cradle-second section 414 form the first contour cradle 150 having the contour shape 224 that is circular and configured to extend around and position the actuators 132 around an entirety of the circumference 324 of the fuselage barrel 406, for example, proximate the first end 396. With the holding structure 126 in the closed state, the second cradle-first section 412 and the second cradle-second section 416 form the second contour cradle 154 having the contour shape 224 that is circular and configured to extend around and position the actuators 132 around an entirety of the circumference 324 of the fuselage barrel 406, for example, proximate the second end 398.

Figure 12:
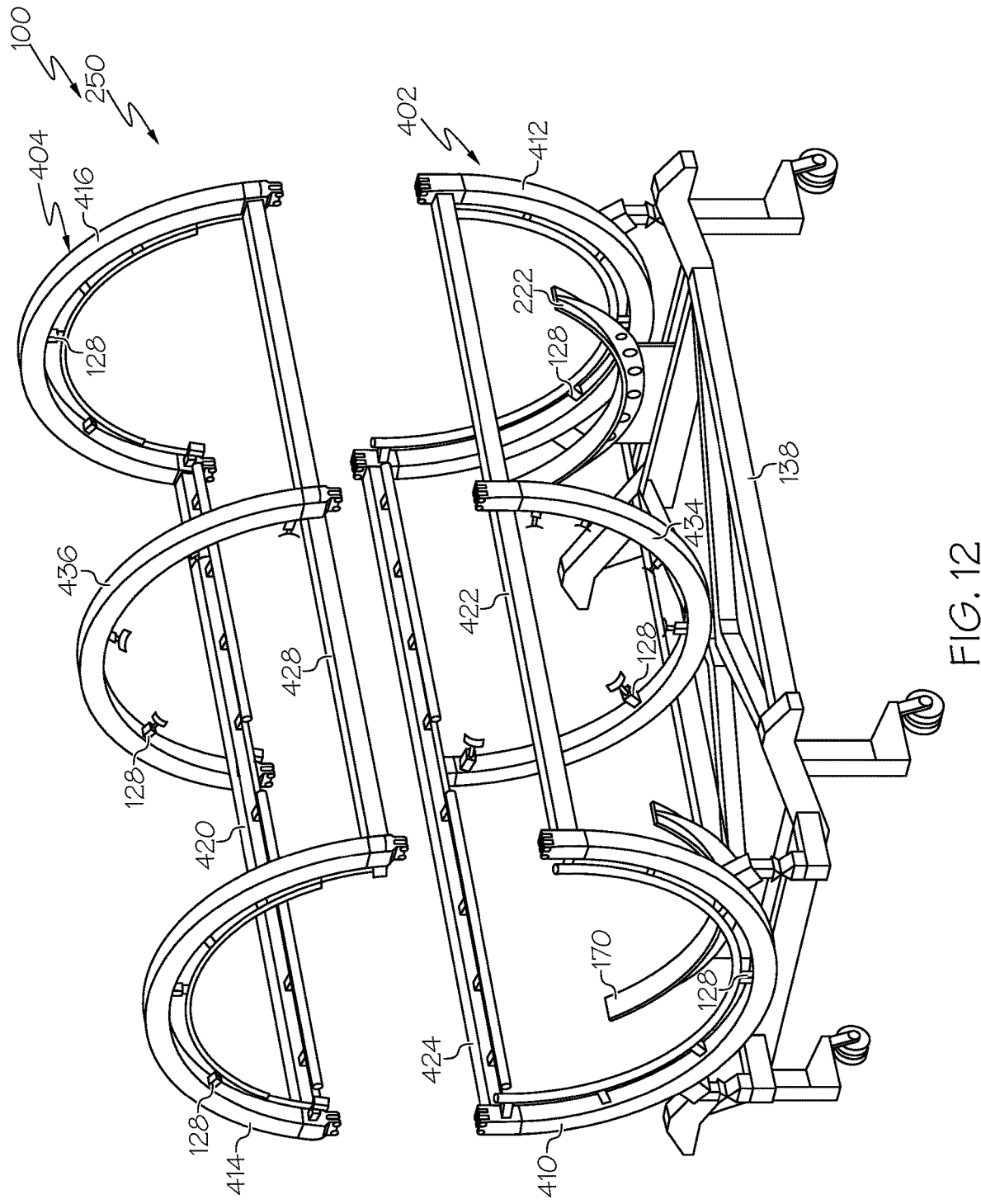
FIG. 12 is a schematic, perspective view of another example of the shaping apparatus, depicted in the open state.
Figure 13:
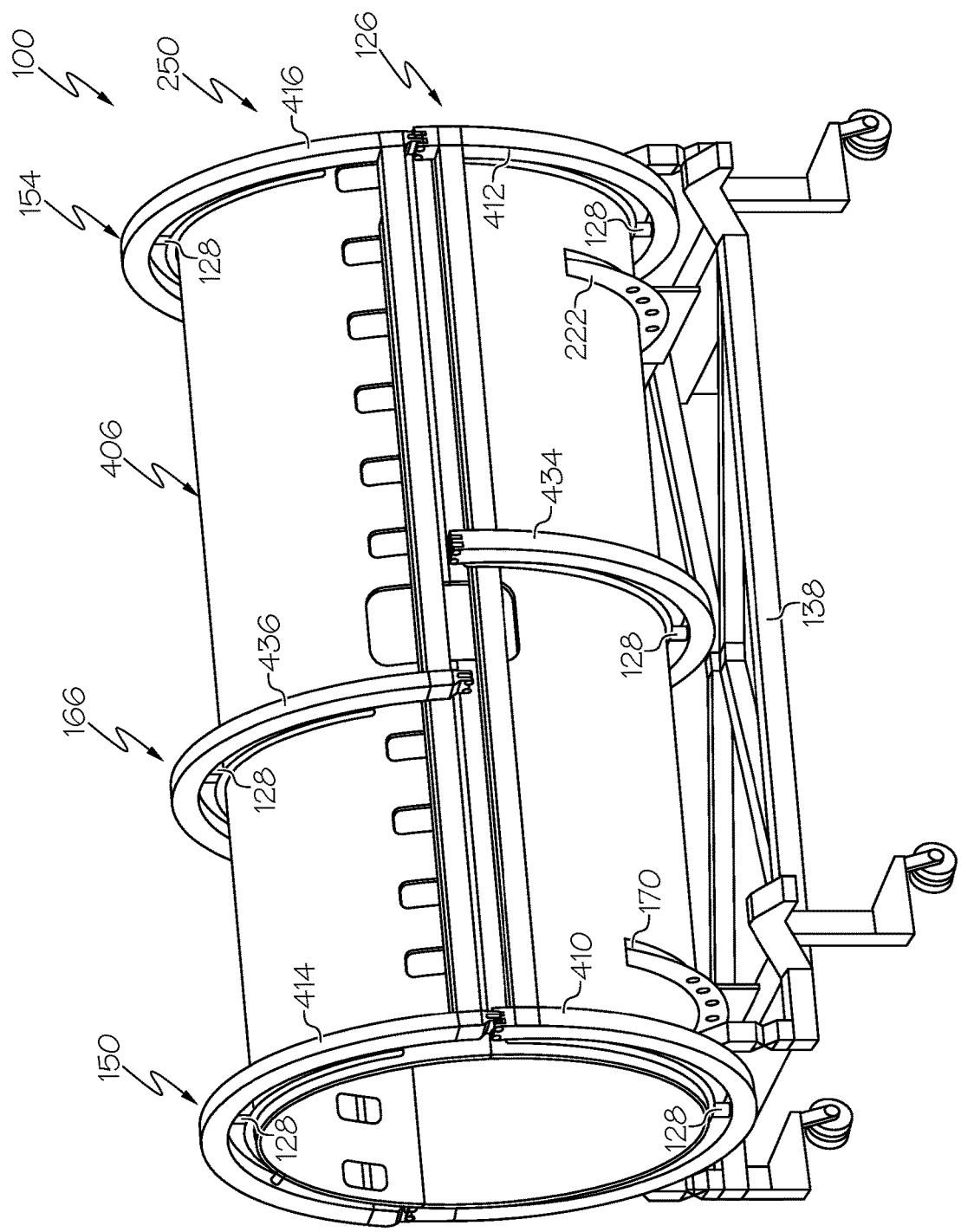
FIG. 13 is a schematic, perspective view of an example of the shaping apparatus and an example of a component loaded in the shaping apparatus.

FIGS. 12 and 13 illustrate other examples of the shaping apparatus 250. The examples illustrated in FIGS. 12 and 13 can be used with monolithic instances of the fuselage barrel 406 (e.g., FIGS. 8 and 9) and with sectionalized instances of the fuselage barrel 406 formed by a number of the fuselage barrel sections 336 (e.g., FIGS. 10 and 11).

In the illustrated examples, the shaping apparatus 250, such as the holding structure 126, includes the third contour cradle 166. A portion of the actuators 132 (identified as instances of the actuator 128) is coupled to the third contour cradle 166.

In one or more examples, the third contour cradle 166 is positioned between the first contour cradle 150 and the second contour cradle 154. In one or more examples, the third contour cradle 166 is movable relative to, such as between, the first contour cradle 150 and the second contour cradle 154. In one or more examples, the third contour cradle 166 is coupled to and is movable along the first longitudinal beam 156 and the second longitudinal beam 162. As such, the third contour cradle 166 enables selective positioning and/or repositioning a portion of the actuators 132 at the select locations 364 of the fuselage barrel 406 and/or the fuselage barrel sections 336 forming the fuselage barrel 406.

In one or more examples, like the first contour cradle 150 and the second contour cradle 154, the first section 402 of the holding structure 126 includes or forms a third cradle-first section 434 of the third contour cradle 166. The second section 404 of the holding structure 126 includes or forms a third cradle-second section 436 of the third contour cradle 166. In one or more examples, the third cradle-first section 434 is coupled to and is movable along the first beam-first section 418 and the second beam-first section 422. The third cradle-second section 436 is coupled to and is movable along the first beam-second section 420 and the second beam-second section 424. In one or more examples, the third cradle-first section 434 and the third cradle-second section 436 move together or in conjunction with each other. Alternatively, in one or more examples, the third cradle-first section 434 and the third cradle-second section 436 move independently or separately from each other.

In other non-illustrated examples, the holding structure 126 can have any other number of contour cradles 218 and/or longitudinal beams 216. One or more of the contour cradles 218 is movable relative to another one of the contour cradles 218, for example, along the length 318 of the fuselage barrel 406. In one or more examples, one or more of the longitudinal beams 216 is movable relative to the contour cradles 218, for example, at selected positions around the circumference 324 of the fuselage barrel 406. In other non-illustrated examples, the holding structure 126 can have any suitable number of (e.g., more than two) sections, for example, in addition to the first section 402 and the second section 404. In these examples, each one of the contour cradles 218 can have any suitable number or cradle sections. Similarly, each one of the longitudinal beams 216 can have any suitable number of beam sections.

As illustrated in FIGS. 8 and 10, when initially loaded in the shaping apparatus 250 and held by the holding structure 126, the fuselage barrel 406 or the first fuselage barrel section 426 is supported by the index cradles 220. In the example illustrated in FIG. 8, the holding structure 126 includes the first index cradle 170 and the second index cradle 222 that initially support a portion of the fuselage barrel 406. In the example illustrated in FIG. 10, the holding structure 126 includes the first index cradle 170 and the second index cradle 222 that initially support a portion of the first fuselage barrel section 426.

As illustrated in FIGS. 9 and 11, with the fuselage barrel 406 (FIG. 9) or the first fuselage barrel section 426 and the second fuselage barrel section 428 (FIG. 11) fully loaded in the shaping apparatus 250 and held by the actuators 132, the index cradles 220 retract relative to the contour cradles 218. In the example illustrated in FIG. 9, the first index cradle 170 and the second index cradle 222 disengage and move away from the fuselage barrel 406. In the example illustrated in FIG. 11, the first index cradle 170 and the second index cradle 222 disengage and move away from the first fuselage barrel section 426.

FIG. 14 schematically illustrates an example of the metrology system 106. In the illustrated example, the stanchion 408 is coupled to the holding structure 126 of the shaping apparatus 250. The stanchion 408 supports the scanners 252. In the illustrated example, the scanners 252 include the structured light scanner 176 and the laser scanner 178. The stanchion 408 positions the scanners 252 within an interior of the fuselage barrel 406 such that the stanchion 408 appropriately positions the scanners 252 to take the measurements 104 (FIG. 1) of the fuselage barrel 406.

Figure 15:
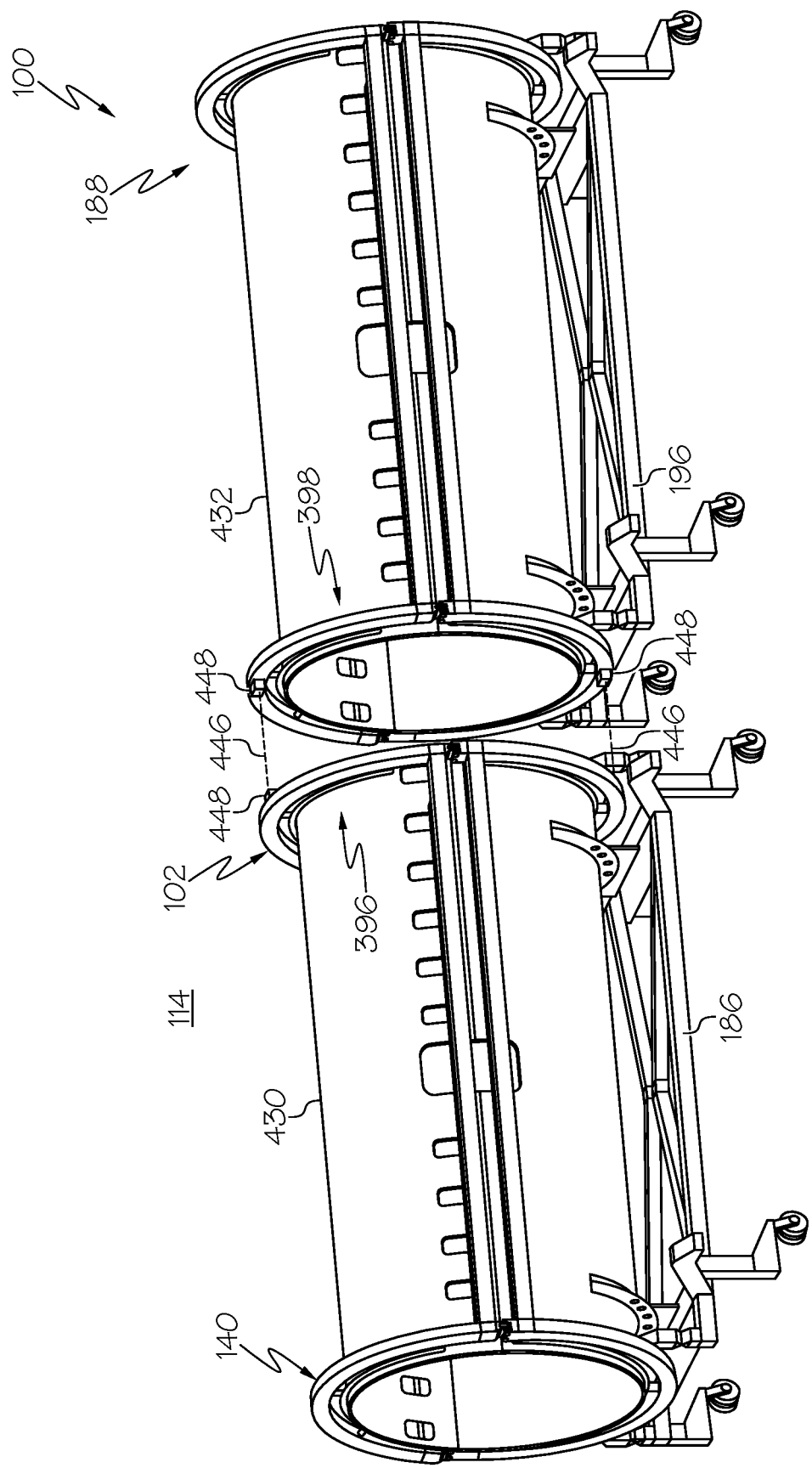
FIG. 15 is a schematic, perspective view of an example of two shaping apparatuses being used to align two components of a structure.

Referring to FIGS. 15 and 16, in one or more examples, the current shape 368 of the first fuselage barrel 430 and/or the second fuselage barrel 432 is controlled, changed, and maintained to be within the tolerance 146 of the target shape 366 by the first shaping apparatus 102 and the second shaping apparatus 188, respectively. Once appropriately shaped, the first shaping apparatus 102 and the second shaping apparatus 188 are used to align the first fuselage barrel 430 and/or the second fuselage barrel 432 (FIG. 16) such that the first fuselage barrel 430 and/or the second fuselage barrel 432 can be joined together to form a portion of the fuselage 1218 (FIG. 17).

In one or more examples, the manufacturing system 100 includes an alignment system 438 (FIG. 1). The alignment system 438 enables selective movement and/or positioning of the shaping apparatuses 190 within the manufacturing environment 114. As an example, the alignment system 438 includes or takes the form of a vision alignment and guidance system 440 (FIG. 2) that is coupled to or forms a portion of each one of the shaping apparatuses 190. As examples, the vision alignment and guidance system 440 includes or takes the form of any suitable computer vision system, machine visions system, laser projection system, laser guidance system, or other hardware and software-based system that is capable of automatically guiding and positioning the shaping apparatuses 190.

As illustrated in FIG. 16, in one or more examples, the alignment system 438 enables alignment of the second end 398 of the first fuselage barrel 430 and the first end 396 of the second fuselage barrel 432. The corresponding, mating ends of the first fuselage barrel 430 and the second fuselage barrel 432 have at least approximately the same shape due to the shaping process performed by the first shaping apparatus 102 and the second shaping apparatus 188 before alignment.

In one or more examples, the vision alignment and guidance system 440 includes a projector 442 and a receiver 444. The projector 442 transmits a guidance signal 446 (e.g., a laser beam, structured light, images, etc.). In one or more examples, the receiver 444 detects, receives, and/or processes the guidance signal 446. As an example, the receiver 444 receives a returned portion of the guidance signal 446 (e.g., reflected laser beam, reflected light, etc.) transmitted by the projector 442. As another example, a first instance of the receiver 444 that is associated with the first shaping apparatus 102 receives the guidance signal 446 transmitted by a second instance of the projector 442 that associated with the second shaping apparatus 188.

In one or more examples, the projector 442 and/or the receiver 444 is coupled to the mobile platform 138 and/or the holding structure 126 of one or more of the shaping apparatuses 190. In these examples, the mobile platform 138 of each one of the shaping apparatuses 190 can be considered or serve as an automated guided vehicle (AVG). In one or more examples, the projector 442 and the receiver 444 are integrated into a single or unitary implementation of a guidance sensor 448.

Figure 18:
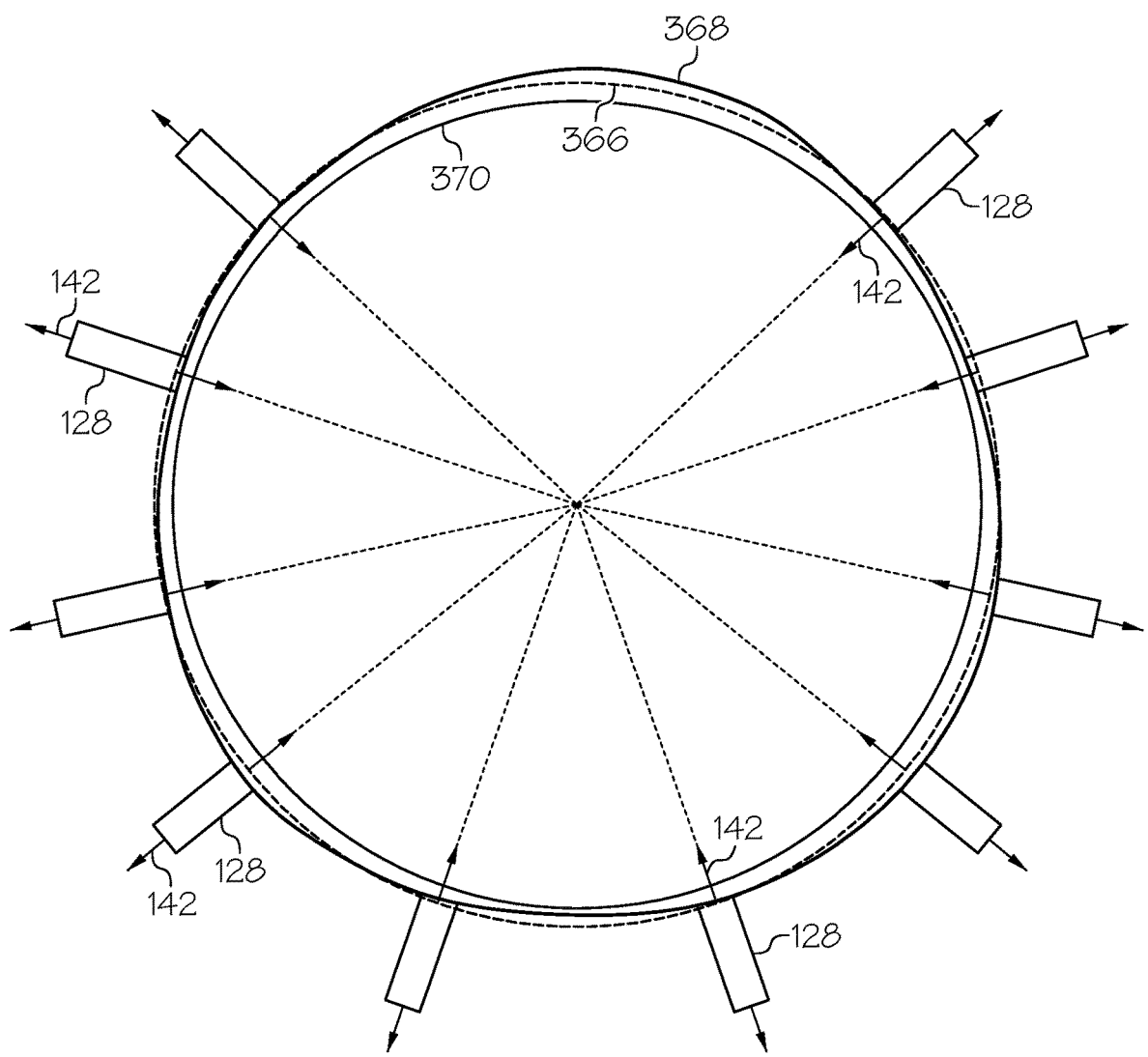
FIG. 18 is a schematic illustration of examples of a nominal shape, a target shape, and a current shape of a component.

FIG. 17 schematically illustrates an example of the shaping apparatus 250 and an example of the fuselage barrel 406 held and shaped by the actuators 132 (FIG. 2). In FIG. 18, the actuators 132 are illustrated as individual instances of the actuator 128. In the illustrated example, the actuators 132 are positioned at the select locations 364 (FIG. 2) around an entirety of the circumference 324 of the fuselage barrel 406. The actuators 132 are commanded by the controller 110 (FIG. 1) to selectively apply the displacements 142 (FIG. 2) at the select locations 364 of the fuselage barrel 406 to change the current shape 368 of the fuselage barrel 406 to within the tolerance 146 of the target shape 366 (FIG. 2).

In one or more examples, once the current shape 368 of the fuselage barrel 406 is within the tolerance 146 of the target shape 366, a sub-structure 388 can be coupled to the fuselage barrel 406. As an example, the sub-structure 388 can include or take the form of a floor assembly that is installed within the fuselage barrel 406. As another example, the sub-structure 388 can include or take the form of stiffeners, splices, annular frame members, and the like that are coupled to an interior surface (e.g., the second surface 328) of the fuselage barrel 406.

FIG. 18 schematically illustrates an example of the nominal shape 370, the target shape 366, and the current shape 368 of the component 360, such as the fuselage barrel 406. As illustrated, it can be appreciated that in certain cases the actual dimensions (e.g., circumference and/or diameter) of the component 360 as manufactured may be different (e.g., larger or smaller) than the design or nominal dimensions of the component 360. In such cases, attempts to change the current shape 368 of the component 360 to the nominal shape 370 may lead to an undesirable shape of the component 360 or may never achieve the tolerance of 146. As such, the nominal shape 370 is modified by the current dimension 376 of the component 360 to generate the target shape 366. In this case, the actuators 132 (illustrated as instances of the actuator 128) can apply the displacements 142 that change the current shape 368 to within the tolerance 146 of the target shape 366.

Figure 19:
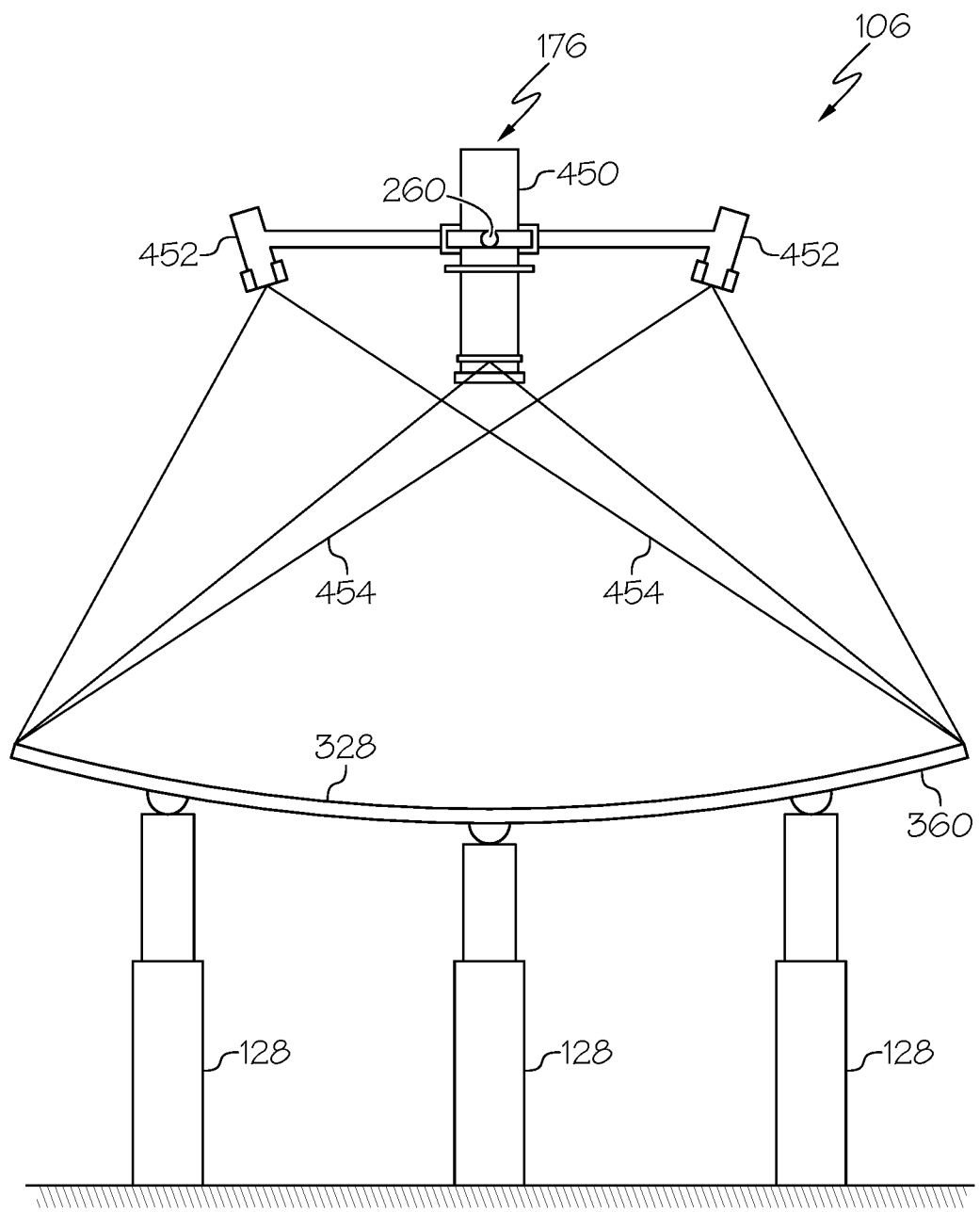
FIG. 19 is a schematic, end view of an example of a portion of the metrology system.
Figure 20:
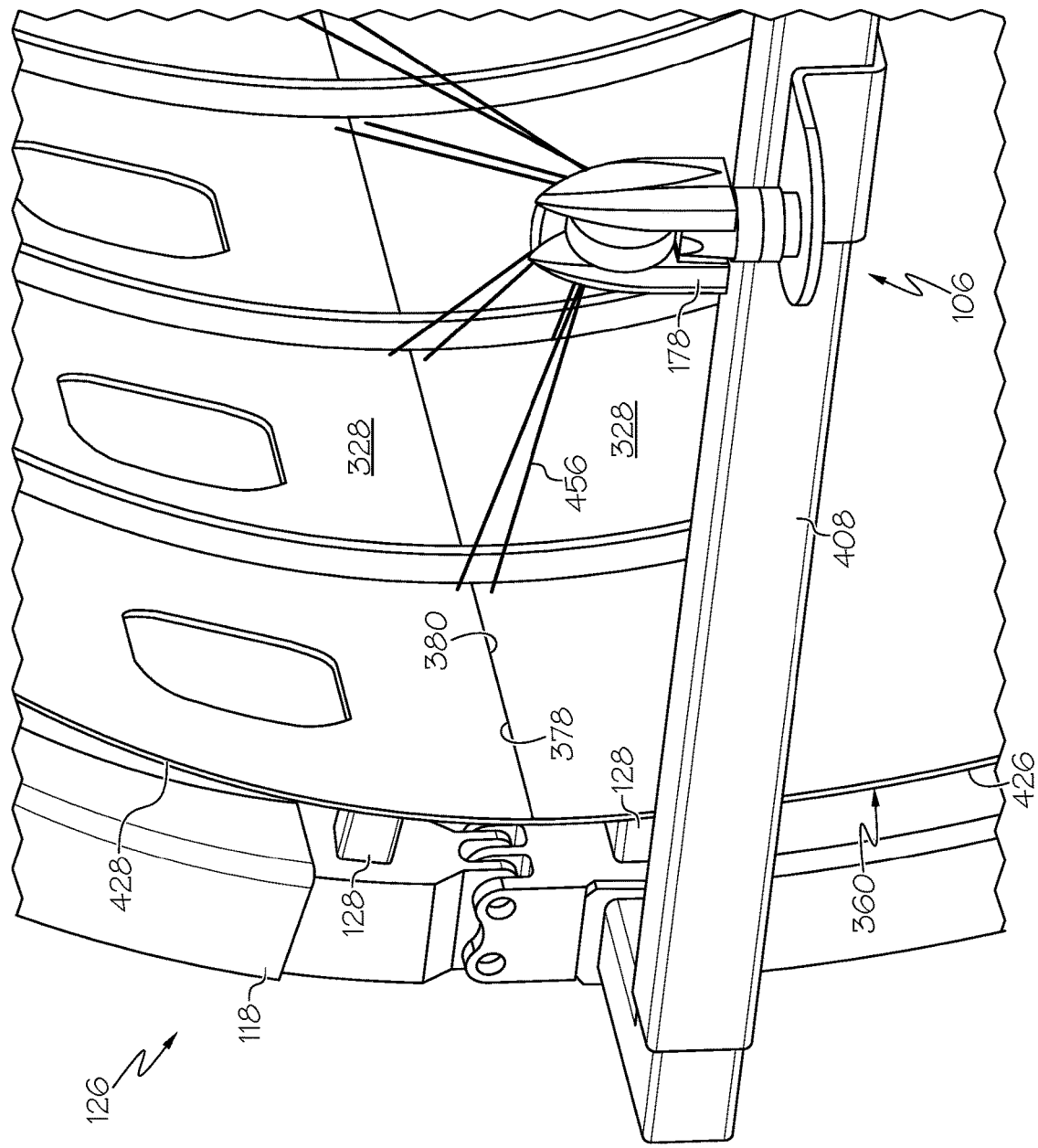
FIG. 20 is a schematic, perspective view of an example of a portion of the metrology system.

FIG. 19 schematically illustrates an example of the metrology system 106. More particularly, FIG. 20 illustrates an example of the structured light scanner 176 used to take the measurements 104 of the component 360. In one or more examples, the component 360 is one of the fuselage barrels 334 (FIG. 1), only a portion of such is shown in FIG. 20. In one or more examples, the component 360 is one of the fuselage barrel sections 336. In one or more examples, the structured light scanner 176 is a 3D scanning device for measuring the three-dimensional shape of an object using projected light patterns and a camera system. In one or more examples, the structured light scanner 176 includes at least one light source 450 and at least one camera 452. The light source 450 projects light 454 onto the second surface 328 of the component 360. As an example, the light source 450 projects a series of parallel patterns onto the second surface 328. When the light 454 projects onto the second surface 328, the patterns become distorted. The camera 452 captures images of the patterns and sends them to 3D scanning software for processing. In one or more examples, the structured light scanner 176 is rotatable about the scan axis 260 such that the light 454 can be projected on an entirety of an interior circumference of the component 360. The measurements 104 taken by the structured light scanner 176 are used by the controller 110 to determine the current shape 368 of the component 360 and to command the actuators 132 (illustrated as instances of the actuator 128) to apply the displacements 142 to change the current shape 368 toward the target shape 366.

Figure 21:
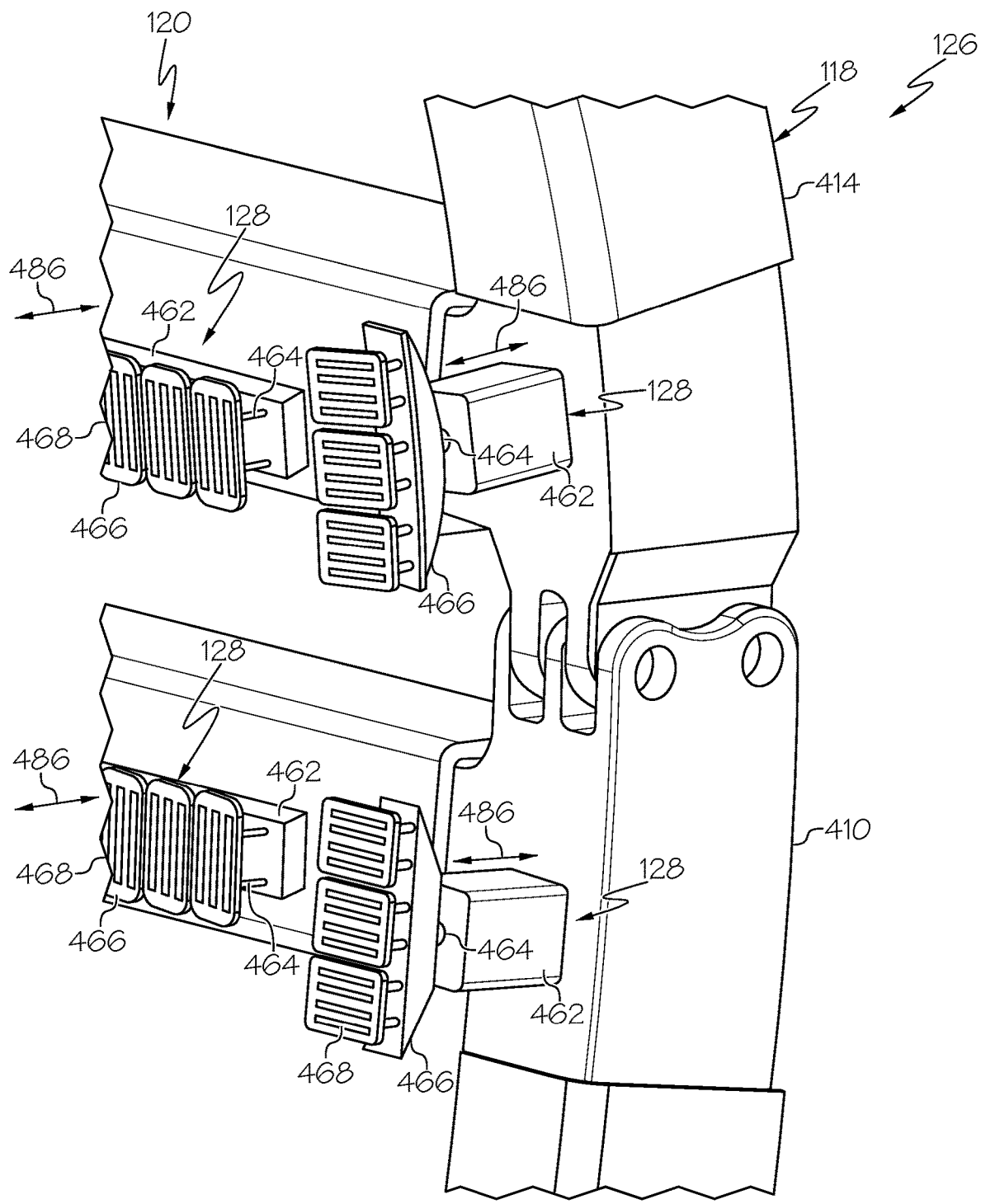
FIG. 21 is a schematic, perspective view of an example of a portion of a holding structure and a portion of a plurality of actuators of the manufacturing system.

FIG. 20 schematically illustrates an example of the metrology system 106. More particularly, FIG. 21 illustrates an example of the laser scanner 178 used to take the measurements 104 of the component 360. In one or more examples, the laser scanner 178 is used when aligning and joining the fuselage barrel sections 336 to assemble the fuselage barrel 334. In the illustrated example, the measurements 104 taken by the laser scanner 178 are used to align the first edge 378 of the first fuselage barrel section 426 and the second edge 380 of the second fuselage barrel section 428. In one or more examples, the laser scanner 178 includes a laser projector and a laser receiver to project laser beams 456 onto the second surface 328 of each one of the first fuselage barrel section 426 and the second fuselage barrel section 428 and receive a reflected laser beam. The measurements 104 taken by the laser scanner 178 are used by the controller 110 to determine the relative positions in 3D space of the first edge 378 and the second edge 380 and to command the actuators 132 (illustrated as instances of the actuator 128) to apply the displacements 142 to change the relative positions in 3D space of the first edge 378 and the second edge 380 and align the first edge 378 and the second edge 380. Upon suitable alignment of the first edge 378 and the second edge 380, a splice or other fastening structure (not shown in FIG. 21) can be coupled to the first fuselage barrel section 426 and the second fuselage barrel section 428 along the joint formed between the first edge 378 and the second edge 380.

Figure 22:
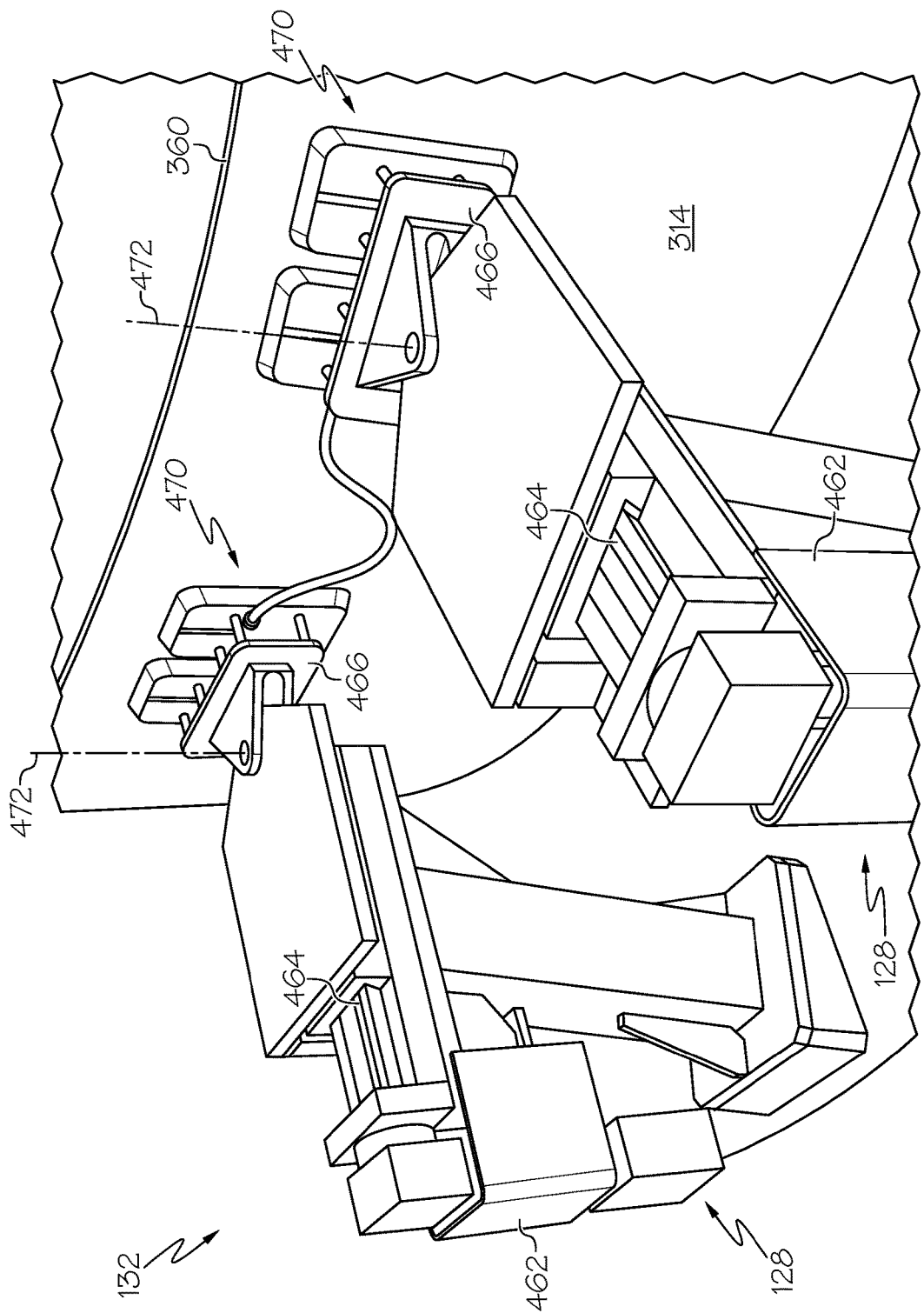
FIG. 22 is a schematic, perspective view of an example of a portion of the actuators of the manufacturing system.

FIG. 21 schematically illustrates an example a portion of the holding structure 126 and multiple instances of the actuator 128. The actuator 128 is an example of any one or every one of the actuators 132 (FIG. 2). In one or more examples, the actuator 128 is coupled to the contour cradle 118 and is positioned to apply the displacements 142 at one of the select locations 364 along the contour 340 of the component 360 (not shown in FIG. 22). In one or more examples, the actuator 128 is coupled to the longitudinal beam 120 and is positioned to apply the displacements 142 at one of the select locations 364 along the length 318 of the component 360. The example illustrated in FIG. 22 shows four instances of the actuator 128. However, any feasible number of instances of the actuator 128 can be implemented.

In one or more examples, the actuator 128 is a linear actuator. In one or more examples, the actuator 128 includes a motor 462 and a linear member 464. In one or more examples, the motor 462 takes any one of various forms depending on the particular implementation of the shaping apparatus 250. For example, the motor 462 can be electrical, hydraulic, pneumatic, or some other type of motor. In one or more examples, the linear member 464 includes a foot 466 at an end that contacts the first surface 314 of the component 360. In one or more examples, the linear member 464 of the actuator 128 moves in the directions of directional arrow 486. Similarly, the actuator 128 applies the displacements 142 in the direction of the directional arrow 486.

In one or more examples, the actuator 128 (e.g., each one of the actuators 132) includes a gripper 468. The gripper 468 is coupled to or is located at an end of the foot 466. The gripper 468 is coupleable to the component 360. In one or more examples, the gripper 468 is coupleable to the component 360 by vacuum. For example, the gripper 468 is a vacuum gripper.

Figure 23:
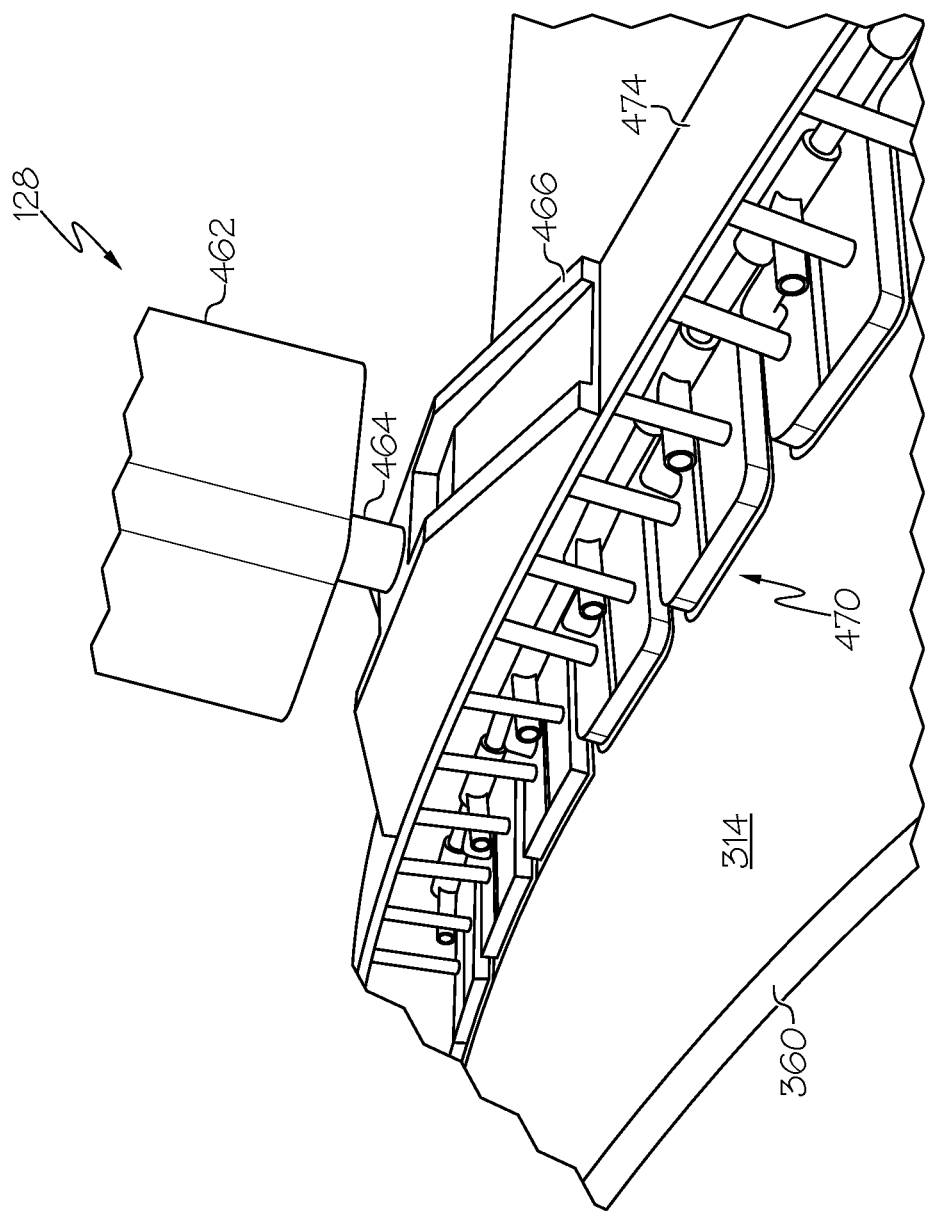
FIG. 23 is a schematic, perspective view of an example of an actuator of the manufacturing system.

FIG. 22 schematically illustrates another example of multiple instances of the actuator 128. The actuator 128 is an example of any one or every one of the actuators 132 (FIG. 2). In one or more examples, the actuator 128 includes or is associated with a plurality of grippers 470. As an example, the grippers 470 are coupled to the foot 466 of the actuator 128. Use of the grippers 470 enables application of the displacements 142 and distribution of the forces 108 associated with the displacements 142 over a larger area. In one or more example, the foot 466 is rotatable or pivotable relative to the linear member 464, for example, about a pivot axis 472. Pivotable motion of the foot 466 relative to the linear member 464 enables automatic adjustment of the relative orientation of the grippers 470 such that the gripper 470 can conform to accommodate variations in the contour 340 of the component 360 within the area of the first surface 314 to which the grippers 470 attach. The example illustrated in FIG. 23 shows two instances of the actuator 128. However, any feasible number of instances of the actuator 128 can be implemented.

Figure 24:
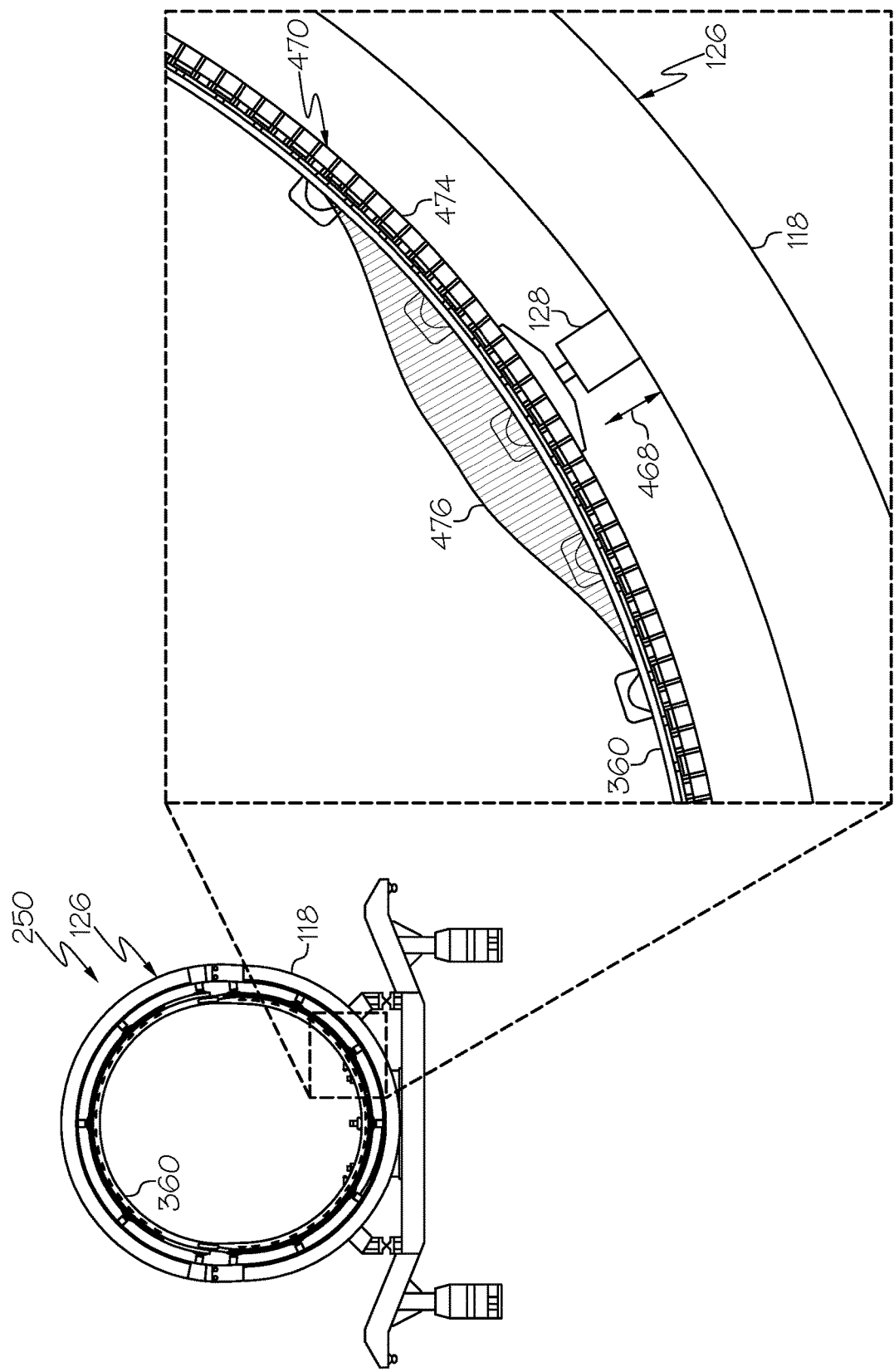
FIG. 24 is a schematic illustration of a distribution of displacements and forces applied to a component during a shaping process.

FIG. 23 schematically illustrates another example of the actuator 128. The actuator 128 is an example of any one or every one of the actuators 132 (FIG. 2). In one or more examples, the actuator 128 includes or is associated with a plurality of the grippers 470. In one or more examples, the shaping apparatus 250 includes a band 474. In one or more examples, the band 474 includes or takes the form of a long, narrow strip of relatively flexible material. In one or more examples, the band 474 is associated with the contour cradle 218 (not shown in FIG. 24). As an example, the band 474 extends along the contour cradle 218 and has a shape that substantially matches the contour shape 224 of the contour cradle 218. In one or more examples, band 474 has a shape that is configured to extend along at least a portion of the contour 340 of the component 360. In one or more examples, band 474 has a shape that is configured to extend along an entirety of the contour 340 of the component 360. As an example, the band 474 has a circular shape that is configured to extend around an entirety of the circumference 324 of the component 360 (e.g., the fuselage barrels 334). As another example, the band 474 has an arcuate shape that is configured to extend about a portion of the circumference 324 of the component 360 or along an entirety of the arc length 316 of the component 360 (e.g., the fuselage barrel sections 336). In one or more examples, foot 466 of the actuator 128 is coupled to the band 474. The grippers 470 are coupled to the band 474 opposite the foot 466 of the actuator 128. In one or more examples, the grippers 470 extend along an entirety of the band 474. In one or more examples, the grippers 470 extend along a portion of the band 474. The example illustrated in FIG. 24 shows one instance of the actuator 128 coupled to the band 474. However, any feasible number of instances of the actuator 128 can be implemented.

FIG. 24 schematically illustrates an example of a portion of an interface between the actuator 128 and the component 360 during application of the displacements 142. In the illustrated example, the actuator 128 is coupled to the band 474 and the grippers 470 are coupled to and extend along the band 474. The grippers 470 are coupled to the first surface 314 of the component 360. In one or more examples, the displacements 142 and/or the forces 108 associated with the displacements 142 are distributed across an area of the component 360 proximate or surrounding the select locations 364. As an example, the band 474 and the grippers 470 provide a distribution 476 of displacement and/or force. In the illustrated example, a greatest magnitude of the displacement and/or the force along the distribution 476 is applied to the component 360 at the position of the actuator 128. The magnitude of the displacement and/or the force progressively decrease along the distribution 476 away from the position of the actuator 128.

Figure 25:
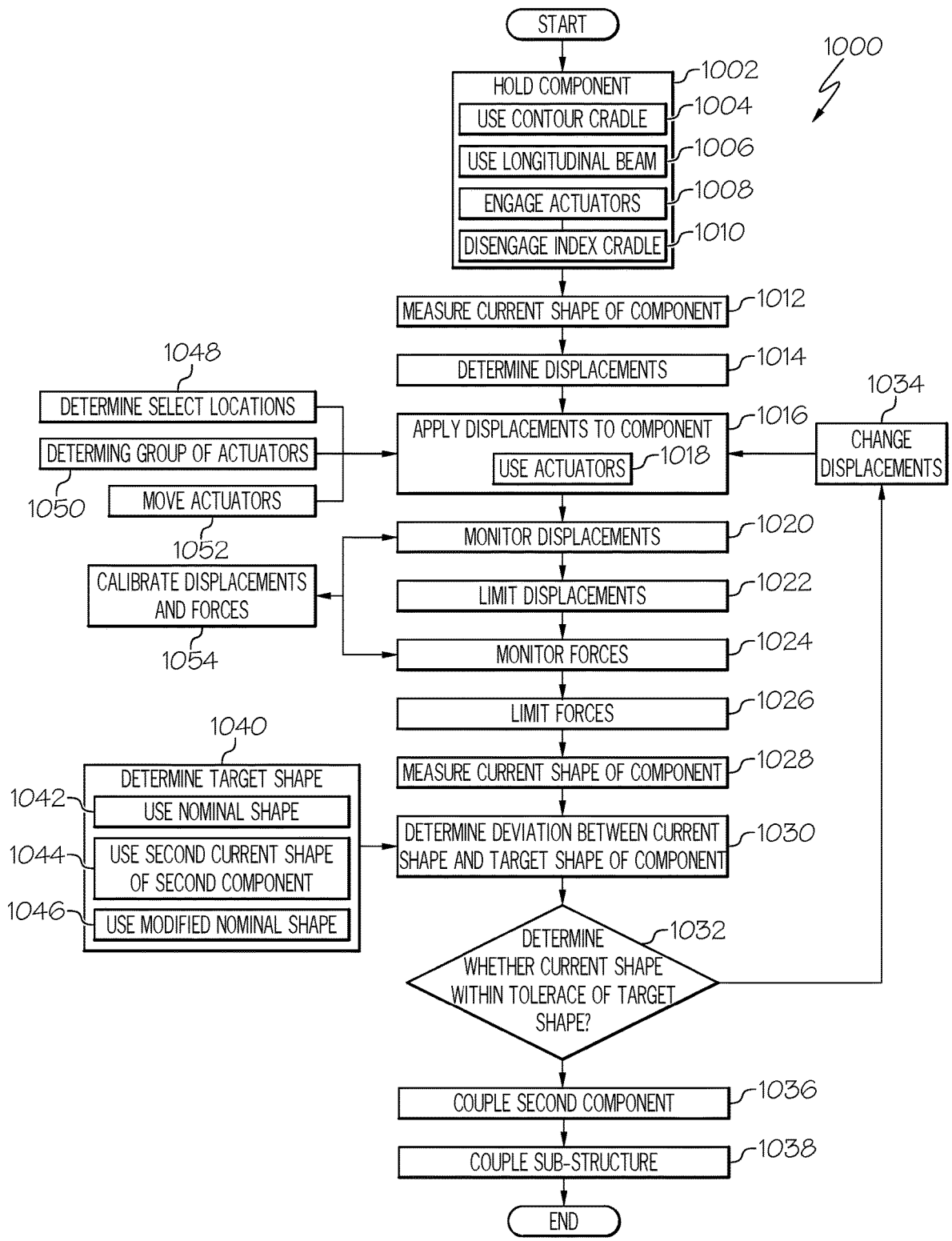
FIG. 25 is a flow diagram of an example of a method for assembling a structure.

Referring generally to FIGS. 1-24 and particularly to FIG. 25, by way of examples, the present disclosure is also directed to a method 1000 for assembling the structure 300. The method 1000 uses the closed loop control system for adjusting the shape and relative positions of fuselage barrels to be joined, thereby achieving optimal shimming and alignment.

In one or more examples, the method 1000 includes a step of (block 1002) holding the component 360. In one or more examples, the step of (block 1002) is performed using the shaping apparatus 250. In an example, the step of (block 1002) holding includes a step of (block 1004) using one or more of the contour cradles 218, such as the contour cradle 118. For example, holding the component 360 is performed using the contour cradle 118 that extends along an entirety of the contour 340 of the component 360. In another example, the step of (block 1002) holding includes a step of (block 1006) using one or more of the longitudinal beams 216, such as the longitudinal beam 120. In another example, the step of (block 1002) holding includes a step of (block 1008) engaging the actuators 132. The step of (block 1008) engaging the actuators 132 includes a step of positioning the actuators 132 in contact with the component 360 and coupling the actuators 132 to the component 360. In another example, the step of (block 1002) holding includes a step of (block 1010) disengaging at least one of the index cradles 220, such as the index cradle 124. The step of (block 1010) disengaging the index cradles 220 is performed after the step of (block 1008) engaging the actuators 132.

In one or more examples, the method 1000 includes a step of (block 1012) measuring the current shape 368 of the component 360. The current shape 368 of the component 360 is determined using the measurements 104 taken by the metrology system 106.

In one or more examples, the method 1000 includes a step of (block 1014) determining the displacements 142 intended to change the current shape 368 of the component 360 toward the target shape 366 of the component 360. In one or more examples, determining the displacements 142 is performed using the Gaussian Process model 282.

In one or more examples, the method 1000 includes a step of (block 1016) applying the displacements 142 to the select locations 364 of the component 360 to change the current shape 368 of the component 360 toward the target shape 366 of the component 360. In one or more examples, the step of (block 1016) applying includes a step of (block 1018) using the actuators 132 to push and/or pull the component 360 at the select locations 364. In an example, applying the displacements 142 is performed using a portion of the actuators 132 that is coupled to the contour cradle 118. In an example, applying the displacements 142 is further performed using a portion of the actuators 132 that is coupled to the longitudinal beam 120 that extends along an entirety of the length 318 of the component 360.

In one or more examples, the method 1000 includes a step of (block 1020) monitoring the displacements 142 that are applied to the component 360. In one or more examples, the method 1000 includes a step of (block 1022) limiting the displacements 142 to the predetermined displacement limit 276.

In one or more examples, the method 1000 includes a step of (block 1024) monitoring the forces 108 that are applied to the component 360 while applying the displacements 142. In one or more examples, the method 1000 includes a step of (block 1026) limiting the forces 108 to the predetermined force limit 248.

In one or more examples, the method 1000 includes a step of (block 1028) measuring the current shape 368 of the component 360 again. The step of (block 1028) is performed after the step of (block 1016) applying the displacements 142.

In one or more examples, the method 1000 includes a step of (block 1030) determining the deviation 144 between the current shape 368 and the target shape 366. The method 1000 includes a step of (block 1032) determining whether the current shape 368 is within the tolerance 146 of the target shape 366. When the current shape 368 is not within the tolerance 146 of the target shape 366, the method 1000 includes a step of (block 1034) changing the displacements 142 in response to changes in the current shape 368 until the current shape 368 is within the tolerance 146 of the target shape 366. As an example, the method 1000 includes a step of responding to changes in the current shape 368 that have not yet reached the target shape 366 and a step of providing iterative changes in the displacements 142, such as subsequent instances of the new displacements 488, applied to the component 360 for incremental changes in the current shape 368 to the target shape 366 within the tolerance 146.

When the current shape 368 is within the tolerance 146 of the target shape 366, the method 1000 proceeds with further assembly of the structure 300. In one or more examples, according to the method 1000, the component 360 is the first component 302. The method 1000 includes a step of (block 1036) coupling the second component 342 to the first component 302 after the current shape 368 is within the tolerance 146 of the target shape 366. In one or more examples, the method 1000 includes a step of (block 1038) coupling the sub-structure 388 to the component 360 after the current shape 368 is within the tolerance 146 of the target shape 366.

In one or more examples, the method 1000 includes a step of (block 1040) determining or generating the target shape 366. In one or more examples, the step of (block 1040) determining the target shape 366 includes a step of (block 1042) using the nominal shape 370 of the component 360 as the target shape 366. In one or more examples, according to the method 1000, the component 360 is the first component 302 and the current shape 368 is the first current shape 304 of the first component 302. The step of (block 1040) determining the target shape 366 includes a step of (block 1044) using the second current shape 326 of the second component 342 as the target shape 366. In one or more examples, according to the method 1000, the step of (block 1040) determining the target shape 366 includes a step of (block 1046) using the modified nominal shape 372 as the target shape 366. The modified nominal shape 372 includes the nominal shape 370 in which the nominal dimension 374 of the component 360 is replaced by the current dimension 376 of the component 360.

In one or more examples, the method 1000 includes a step of (block 1048) determining the select locations 364 for application of the displacements 142. In one or more examples, determining the select locations 364 is performed using the sparse learning model 274.

In one or more examples, the method 1000 includes a step of (block 1050) determining the group 272 of the actuators 132 to apply the displacements 142 at the select locations 364. In one or more examples, the group 272 of the actuators 132 extend along the entirety of the contour 340 and/or the length 318 of the component 360. In one or more examples, determining the group 272 is performed using the sparse learning model 274.

In one or more examples, the method 1000 includes a step of (block 1052) moving one or more of the actuators 132 relative to the contour cradle 118 and/or the longitudinal beam 120 to the select locations 364. In one or more examples, the select locations 364 extend along the entirety of the contour 340 and/or the length 318 of the component 360.

In one or more examples, the method 1000 includes a step of (block 1054) calibrating the displacements 142 and the forces 108 applied to the component 360.

Accordingly, examples of the manufacturing system 100 and the method 1000 enable the assembly of two or more sections of an aircraft fuselage using sensor input of the fuselage sections edge loading and deflections and integrating the sensor input into a plurality of analysis steps. The analysis steps include: (1) optimal placement of the actuators via sparse learning for shape control; (2) effective model calibration via sensible variable identification and adjustment; (3) active learning for Gaussian process considering uncertainties in the fuselage shape; (4) feasibility analysis of the fuselage shape control via finite element analysis (FEA); (5) calculating a final fuselage load or displacement state based on the analysis; (6) providing signal to fuselage actuators to achieve the final fuselage shape; and (7) assembling the fuselage sections while in the final shape.

Referring to FIGS. 1 and 4, in one or more examples, the controller 110 is adapted or configured to execute instructions and to provide operational commands to components of the system 100, such as to the actuators 132 and the metrology system 106. As an example, the actuators 132 are activated and operate under direction of the controller 110. In one or more examples, the controller 110 is programmed with instructions (e.g., in the form of program code) that, when executed by the controller 110, causes the controller 110 to perform operations. In one or more examples, the controller 110 includes or takes the form of a computing device (e.g., one or more computers). In these examples, the method 1000 is at least partially a computer-implemented method.

In one or more examples, the controller 110 includes or takes the form of a data processing system. In one or more examples, the data processing system of the controller 110 includes a communications framework, which provides communications between a processor 480 and memory 482 (e.g., one or more storage devices). The processor 480 serves to execute instructions for software that can be loaded into the memory 482. In one or more examples, the processor 480 is a number of processor units, a multi-processor core, or some other type of processor, depending on the particular implementation. The memory 482 is an example of a storage device or any piece of hardware that is capable of storing information, such as, for example, without limitation, at least one of data, program code in functional form, or other suitable information either on a temporary basis, a permanent basis, or both on a temporary basis and a permanent basis. The memory 482 may also be referred to as computer readable storage devices in one or more examples. The memory 482 is, for example, a random-access memory or any other suitable volatile or non-volatile storage device. Instructions for at least one of the operating system, applications, or programs can be located in the memory 482, which is in communication with the processor 480. The processes of various examples and operations described herein can be performed by the processor 480 using computer-implemented instructions, which can be located in a memory, such as the memory 482. The instructions are also referred to as program code 484, computer usable program code, or computer readable program code that can be read and executed by the processor 480. The program code 484 in the different examples can be embodied on different physical or computer readable storage media, such as the memory 482. In one or more examples, the program code is located in a functional form on computer readable media that is selectively removable and can be loaded onto or transferred to the data processing system for execution by the processor. In one or more examples, the program code and computer readable media form a computer program product. Additionally, various components of the controller 110 and/or the data processing system may be described as modules. For the purpose of the present disclosure, the term "module" includes hardware, software or a combination of hardware and software. As an example, a module can include one or more circuits configured to perform or execute the described functions or operations of the executed processes described herein. As another example, a module includes a processor, a storage device (e.g., a memory), and computer-readable storage medium having instructions that, when executed by the processor causes the processor to perform or execute the described functions and operations. In one or more examples, a module takes the form of program code and computer readable media, together forming a computer program product.

In one or more examples, the system 100 is implemented using software, hardware, firmware, or a combination thereof. When software is used, the operations performed by the system 100 are implemented using, for example, without limitation, the program code 484 that is configured to run on the processor 480. When firmware is used, the operations performed by the system 100 may be implemented using, for example, without limitation, the program code 484 and data stored in the memory 482 to run on the processor 480. When hardware is employed, the hardware may include one or more circuits that operate to perform the operations performed by the system 100. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

Figure 26:
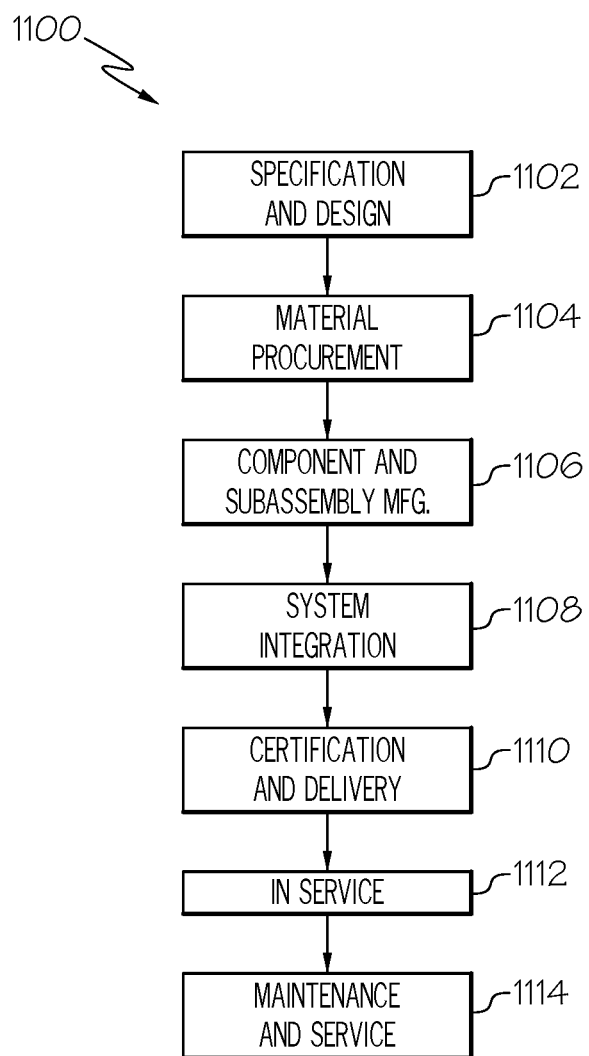
FIG. 26 is a flow diagram of an example of an aircraft manufacturing and service method.

Referring now to FIGS. 26 and 27, examples of the manufacturing system 100, the shaping apparatus 250, and the method 1000 described herein, may be related to, or used in the context of, an aircraft manufacturing and service method 1100, as shown in the flow diagram of FIG. 26 and an aircraft 1200, as schematically illustrated in FIG. 27. For example, the aircraft 1200 and/or the aircraft production and service method 1100 may include the fuselage 1218, the wings 1230, the horizontal stabilizers 1228, the vertical stabilizer 1226, or other components that are shaped and assembled using the manufacturing system 100 and/or according to the method 1000.

Referring to FIG. 27, which illustrates an example of the aircraft 1200. The aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various other structures that are shaped and/or assembled using the manufacturing system 100 and/or the shaping apparatus 250 and/or according to the method 1000.

Referring to FIG. 26, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 26 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the manufacturing system 100, the shaping apparatus 250, and the method 1000 shown and described herein, may be employed during any one or more of the stages of the manufacturing and service method 1100 shown in the flow diagram illustrated by FIG. 26. In an example, shaping the components 312 and assembling the structure 300 using the manufacturing system 100 and/or the shaping apparatus 250 and/or according to the method 1000 may form a portion of component and subassembly manufacturing (block 1106) and/or system integration (block 1108). Further, the structure 300 assembled using manufacturing system 100 and/or the shaping apparatus 250 and/or according to the method 1000 may be implemented in a manner similar to components or subassemblies prepared while the aircraft 1200 is in service (block 1112). Also, the structure 300 assembled using manufacturing system 100 and/or the shaping apparatus 250 and/or according to the method 1000 may be utilized during system integration (block 1108) and certification and delivery (block 1110). Similarly, the structure 300 assembled using manufacturing system 100 and/or the shaping apparatus 250 and/or according to the method 1000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-24 and 27, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-24 and 27, referred to above, need be included in every example and not all elements, features, and/or components described herein are necessarily depicted in each illustrative example. Accordingly, some of the elements, features, and/or components described and illustrated in FIGS. 1-24 and 27 may be combined in various ways without the need to include other features described and illustrated in FIGS. 1-24 and 27, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-24 and 27, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-24 and 27, and such elements, features, and/or components may not be discussed in detail herein with reference to each of FIGS. 1-24 and 27. Similarly, all elements, features, and/or components may not be labeled in each of FIGS. 1-24 and 27, but reference numerals associated therewith may be utilized herein for consistency.

In FIGS. 25 and 26, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 25 and 26 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the manufacturing system 100, the shaping apparatus 250, and the method 1000 have been shown and described, modifications may occur to those skilled in the art upon reading the specification. The present application includes such modifications and is limited only by the scope of the claims.

What is claimed is:

1. A manufacturing system for assembling a structure, the manufacturing system comprising:
a holding structure comprising:
a first contour cradle comprising a first contour shape that at least approximates an initial shape of a component;
first contour actuators coupled to the first contour cradle and configured to apply displacements to select first contour locations of the component to change a current shape of the component toward a target shape of the component;
a second contour cradle that is spaced away from the first contour cradle and comprising a second contour shape that at least approximates the initial shape of the component;
second contour actuators coupled to the second contour cradle and configured to apply displacements to select second contour locations of the component to change the current shape of the component toward the target shape of the component;
a longitudinal beam that extends between the first contour cradle and the second contour cradle; and
longitudinal actuators coupled to the longitudinal beam and configured apply displacements to select longitudinal locations of the component to change the current shape of the component toward the target shape of the component;
a metrology system that takes measurements of the current shape of the component; and
a controller that utilizes a closed feedback loop to determine a deviation between the current shape and the target shape based on the measurements and to provide commands that iteratively change the displacements in response to changes in the current shape until the current shape is within a tolerance of the target shape.

2. The manufacturing system of claim 1, wherein at least one of the first contour actuators is movable along to the first contour cradle relative to the component.

3. The manufacturing system of claim 1, wherein:
the holding structure further comprises a first index cradle that is spaced away from the first contour cradle;
the first index cradle comprises a first index shape that at least approximates the initial shape of the component; and the first index cradle is movable relative to the first contour cradle to selectively engage and disengage the component.

4. The manufacturing system of claim 1, wherein:
each one of the first contour actuators, the second contour actuators, and the longitudinal actuators comprises a gripper; and
the gripper is coupleable to the component by vacuum.

5. The manufacturing system of claim 1, wherein:
the first contour actuators are positioned at the select first contour locations along an entirety of a contour of the component; and
the second contour actuators are positioned at the select second contour locations along an entirety of the contour of the component.

6. The manufacturing system of claim 1, wherein the longitudinal actuators are positioned at the select longitudinal locations along an entirety of a length of the component.

7. The manufacturing system of claim 1, wherein:
the controller determines a current dimension of the component using the measurements and generates the target shape; and
the controller generates the target shape using a nominal shape of the component in which a nominal dimension of the component is replaced by the current dimension.

8. The manufacturing system of claim 1, wherein:
the controller monitors forces applied to the component; and
the displacements are limited by a predetermined force limit.

9. The manufacturing system of claim 1, wherein:
the controller monitors the displacements applied to the component; and
the displacements are limited by a predetermined displacement limit.

10. The manufacturing system of claim 1, wherein the controller determines at least one of the first contour actuators, the second contour actuators, and the longitudinal actuators to apply the displacements and the select first contour locations, the second contour locations, and the longitudinal locations at which to apply the displacements using a sparse learning model.

11. The manufacturing system of claim 1, wherein the controller determines the displacements using a Gaussian Process model.

12. The manufacturing system of claim 1, wherein:
the holding structure comprises:
a first section formed by lower portions of the first contour cradle and the second contour cradle; and
a second section formed by upper portions of the first contour cradle and the second contour cradle; and
the second section is movable relative to the first section such that the holding structure is in an open state or a closed state.

13. The manufacturing system of claim 1, wherein at least one of the second contour actuators is movable along to the second contour cradle relative to the component.

14. The manufacturing system of claim 1, wherein at least one of the longitudinal actuators is movable along to the longitudinal beam relative to the component.

15. The manufacturing system of claim 1, wherein the holding structure further comprises:
a third contour cradle that is positioned between the first contour cradle and the second contour cradle and comprising a third contour shape that at least approximates the initial shape of the component; and third contour actuators coupled to the third contour cradle and configured to apply displacements to select third contour locations of the component to change the current shape of the component toward the target shape of the component.

16. The manufacturing system of claim 15, wherein the third contour cradle is coupled to the longitudinal beam and is movable along the longitudinal beam relative to the component between the first contour cradle and the second contour cradle.

17. The manufacturing system of claim 15, wherein at least one of the third contour actuators is movable along to the third contour cradle relative to the component.

18. A shaping apparatus for shaping a component, the shaping apparatus comprising: a holding structure that supports the component; actuators that are coupled to the holding structure, that are movable along the holding structure relative to the component, and that are configured to apply displacements to the component; and a controller configured to: determine select locations on the component for positioning of the actuators; determine select ones of the actuators to selectively apply the displacements to the select locations of the component to change a current shape of the component toward a target shape of the component; operate the select ones of the actuators to selectively apply the displacements to the select locations of the component; determine a deviation between the current shape and the target shape based on measurements of the component; and in response to changes in the current shape and until the current shape is within a tolerance of the target shape, determine: new select locations on the component for repositioning of the actuators; new select ones of the actuators to selectively apply displacements to the new select locations of the component; and new displacements for application by the actuators, wherein determination of the select locations for application of the displacements uses a sparse learning model that: adjusts an initial shape by distortions in the initial shape; reduces a weighted mean square of adjusted shape deviations to determine the select locations at which the displacements are to be applied; and calculates deformation in the initial shape in response to application of the displacements at the select locations.

19. The shaping apparatus of claim 18, wherein:
each one of the actuators comprises a gripper; and
the gripper is coupleable to the component by vacuum.

20. A method for assembling a structure, the method comprising steps of: supporting a component by a holding structure; measuring a current shape of the component; determining select locations of the component for application of displacements; positioning actuators along the holding structure at the select locations; applying the displacements to the select locations of the component to change the current shape of the component toward a target shape of the component; determining a deviation between the current shape and the target shape; and in response to changes in the current shape and until the current shape is within a tolerance of the target shape: changing one or more of the displacements; changing one or more of the select locations; and changing position of one or more of the actuators along the holding structure, wherein determining and changing the select locations for application of the displacements uses a sparse learning model by: adjusting an initial shape by distortions in the initial shape; reducing a weighted mean square of adjusted shape deviations to determine the select locations at which the displacements are to be applied; and calculating deformation in the initial shape in response to application of the displacements at the select locations.

21. The method of claim 20, wherein:
the component is a first component; and
the method further comprises coupling a second component to the first component after the current shape is within the tolerance of the target shape.

22. The method of claim 20, further comprising coupling a sub-structure to the component after the current shape is within the tolerance of the target shape.

23. The method of claim 20, further comprising using a nominal shape of the component as the target shape.

24. The method of claim 20, wherein:
the component is a first component and the current shape is a first current shape of the first component; and
the method further comprises using a second current shape of a second component as the target shape.

25. The method of claim 20, further comprising using a modified nominal shape as the target shape,
wherein the modified nominal shape comprises a nominal shape in which a nominal dimension of the component is replaced by a current dimension of the component.

* * * * *